United States Patent [19]

Feldman et al.

[11] Patent Number: 4,574,284

[45] Date of Patent: Mar. 4, 1986

[54] COMMUNICATION BUS INTERFACE UNIT

[75] Inventors: David G. Feldman, El Segundo; Hubert M. France, Jr., Palos Verdes Estates, both of Calif.

[73] Assignee: TRW Inc., Redondo Beach, Calif.

[21] Appl. No.: 461,282

[22] Filed: Jan. 26, 1983

[51] Int. Cl.$^4$ .......................... H04Q 9/00; H04J 6/02
[52] U.S. Cl. .......................... 340/825.52; 340/825.05; 370/79; 370/86
[58] Field of Search ...................... 340/825.52, 825.05, 340/825.5, 825.02; 370/79, 85, 86, 94

[56] References Cited

U.S. PATENT DOCUMENTS

| | | |
|---|---|---|
| 3,697,959 | 10/1972 | Abramson et al. |
| 3,742,148 | 6/1973 | Ledeen et al. |
| 3,924,240 | 12/1975 | Given |
| 4,063,220 | 12/1977 | Metcalfe et al. ................. 340/825.5 |
| 4,168,469 | 9/1979 | Parikh et al. |
| 4,210,780 | 7/1980 | Hopkins et al. ........................ 370/80 |
| 4,242,749 | 12/1980 | Takezoe ................................ 370/85 |
| 4,262,171 | 4/1981 | Schneider et al. ............. 179/18 BF |
| 4,271,507 | 6/1981 | Gable et al. ............................ 370/79 |
| 4,373,183 | 2/1983 | Means et al. ...................... 340/825.5 |
| 4,387,425 | 6/1983 | El-Gohary ............................ 370/85 |
| 4,399,531 | 8/1983 | Grande et al. ................. 340/825.02 |
| 4,423,414 | 12/1983 | Bryant et al. .................. 340/825.52 |
| 4,464,749 | 8/1984 | Ulug ..................................... 370/85 |

*Primary Examiner*—Donald J. Yusko
*Attorney, Agent, or Firm*—James W. Paul; Noel F. Heal; Robert J. Stern

[57] ABSTRACT

Apparatus and a related method for interfacing digital device with a communication bus in a local-area computer network. Each device in the network is connected to the bus through a bus interface unit providing the device user with the ability to establish a connection with another device by means of a simple CALL command that does not require the use of physical identifiers. The unit also allows the user to enter a TAlK mode in which a two-way conversation may be conducted over the network without the intervention of a host computer. A REMOTE command allows an unattended device to be controlled from another user site and also permits one user to connect two remotely located devices. A message command allows a message to be stored and held for a remote user, again without the intervention of a host computer.

18 Claims, 22 Drawing Figures

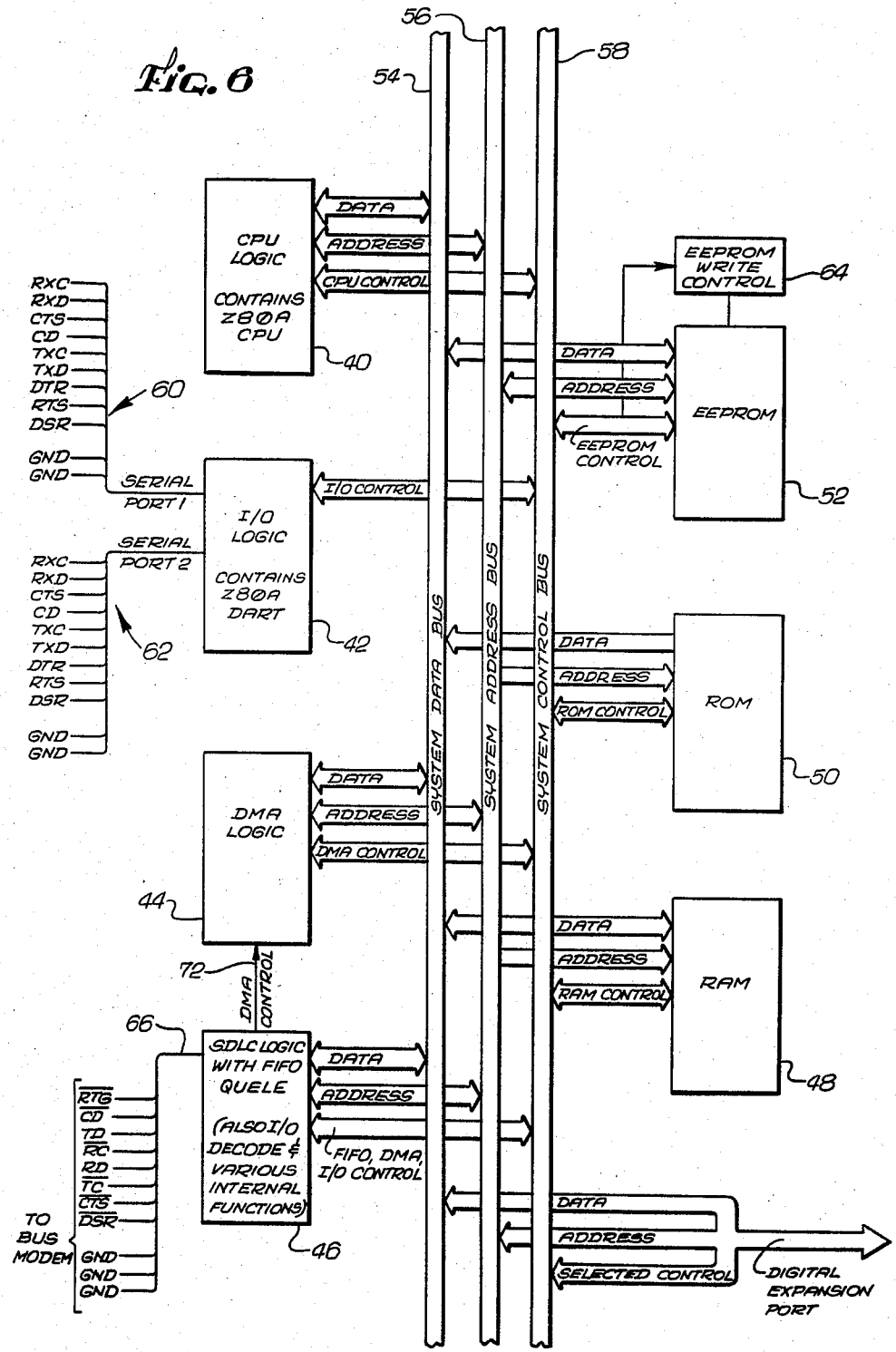

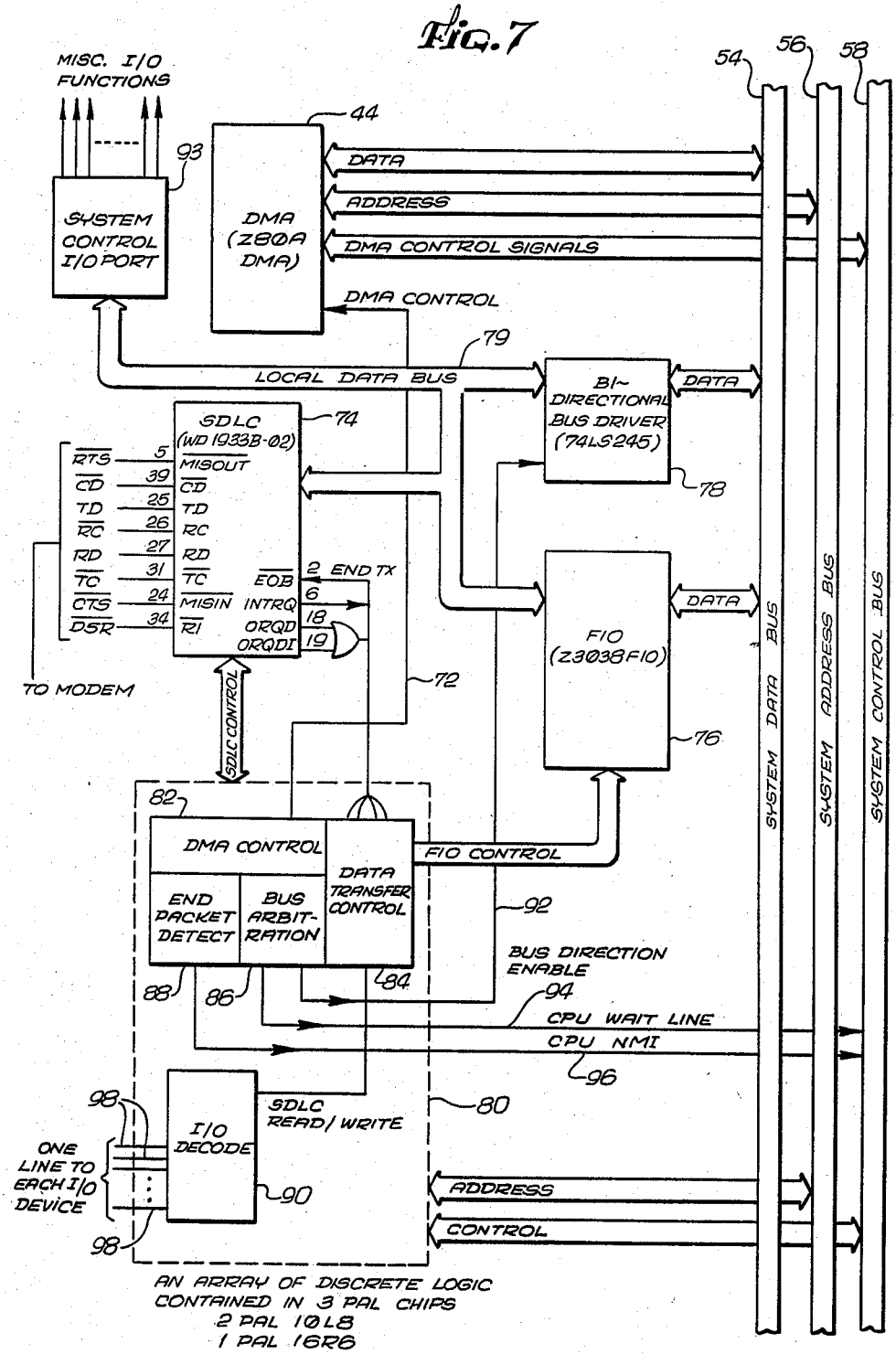

LEGEND FOR FIGS 12-17

| MNEMONIC | MESSAGE |
|---|---|
| ACK | ACKNOWLEDGE DATA |
| WAC | WAIT - ACKNOWLEDGE |
| NAC | NO - DATA ACKNOWLEDGE |
| CRA | CONNECT REQUEST ACKNOWLEDGE |
| QAA | QUERY ACKNOWLEDGE ACKNOWLEDGE |
| NRA | NAME REQUEST ACKNOWLEDGE |
| DIS | DISCONNECT |
| QBN | QUERY-BY-NAME |
| RSM | RESUME WITH DATA |
| DAT | USER DATA PACKET |
| CRQ | CONNECT REQUEST |
| NRQ | NAME REQUEST |
| QNA | QUERY NAME ACKNOWLEDGE |
| CAB | CONNECT ACKNOWLEDGE BUSY |

| SYMBOL | MEANING |
|---|---|
| ----- MSG | MESSAGE SENT USING NORMAL CONTENTION PROTOCOL |
| ⟶ MSG | MESSAGE SENT DURING IMMEDIATE ACKNOWLEDGE WINDOW |
| (STATE 1) —TRIGGER/ACTION→ (STATE 2) | "TRIGGER" EVENT CAUSES "ACTION" AND ALSO RESULTS IN TRANSITION FROM STATE 1 TO STATE 2 |

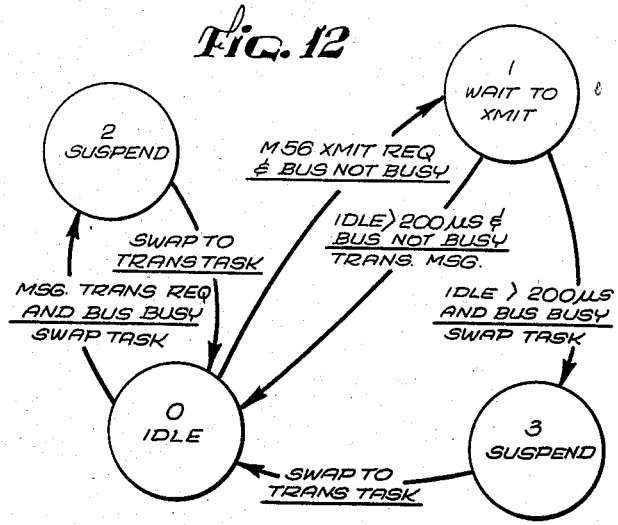

Fig. 12

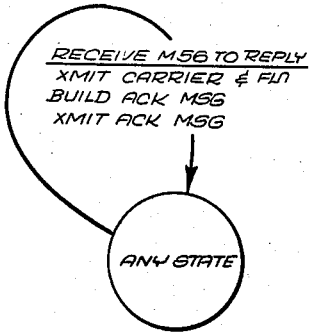

Fig. 13

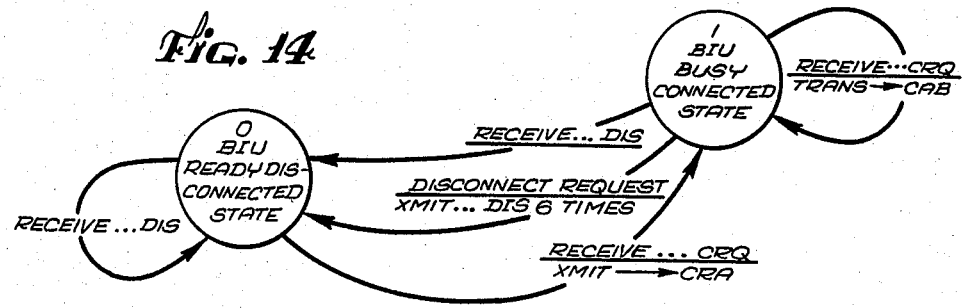

Fig. 14

NOTES: RM = RECEIVER DRIVEN MODE
SM = SENDER DRIVEN MODE

COMMUNICATION BUS INTERFACE UNIT

BACKGROUND OF THE INVENTION

This invention relates generally to local-area computer networks, and more particularly, to an interface unit for connection between a communication bus and any of a variety of devices, such as computers, display and keyboard terminals, and printers. As computers have become less expensive and more numerous, there has been an increasing demand for simple techniques that permit interconnection of computers, terminals and computer peripherals, such as printers. When connected to a network, relatively inexpensive desk-top computers can gain access to larger computers and to high-speed printers and large-capacity memory devices.

Another advantage of computer networks is that the users of the interconnected devices may communicate with each other by what is now referred to as electronic mail. In a typical electronic mail system a "host" computer accepts and temporarily stores messages transmitted from one user to another. The messages may be immediately forwarded to their destinations, or may be held until the intended recipient connects with the host computer and "picks up" his electronic mail. In any event, a host computer is required to act as the "post office" in most mail systems of this type.

Of course, computers may be interconnected through telephone lines, using a relatively simple modulator-demodulator (modem) for connecting each computer or terminal to the telephone circuit. Again, at least one device in such a network, usually the host computer, has to supply the "intelligence" for directing the steps of communication among the connected devices. This invention, however, is concerned with a different type of network, referred to as a local-area network, in which the connected devices are usually located in a relatively small geographical area. For example, many offices of a corporation may have a number of terminals, computers and other devices connected to a single local-area network. This would allow all of the network users to share the same data bases, to have access to the same computer programs, and to communicate with each other in day to day activities. More specifically, users could access the same word-processing programs and text files, could use a common telephone directory, and could generate and distribute internal memoranda and reports over the network.

A variety of local-area networks have been developed in recent years, employing differing network topologies and differing communication protocols. This invention is specifically concerned with networks having a simple bus topology, to which each of the connectable devices, or "nodes," is connected through a bus interface unit. Access to a communication bus may be regulated by a number of different approaches. One is to allocate time to each connected node on some uniform time-division multiplexing basis. A more common approach is to allow any node to transmit on the bus when ready to do so, but to provide some means for sensing whether another transmission is also taking place. The latter is sometimes referred to as a carrier-sense multiple access system. The present invention is embodied in a system employing this latter approach, although the principles of the invention could be applied to systems employing other schemes for controlling bus access.

The use of a bus interface unit between a network device and the communication bus is not new in itself. U.S. Pat. No. 4,161,786 to George T. Hopkins et al. discloses a digital bus communication system in which bus interface units are connected between the bus and the "subscriber devices." The bus interface units in the Hopkins system appear to be used in part for participating in the control of access to the bus.

Broadly stated, the function of any bus interface unit in a local-area network is to provide modulation and demodulation of messages, and to some degree, to format messages for transmission and to detect and decode received messages. Although a variety of local-area network equipment is available today, the establishment of a communication link from a terminal to a computer on the network is not conveniently made. Moreover, a certain amount of computing power in the nature of system overhead, either at the host computer or at an intelligent terminal, is required to establish and maintain the link. Communication between relatively "dumb" terminals is usually made through a host computer, and then not in a conveniently conversational mode.

Ideally, a bus interface unit for use in a local-area network should render the bus as "transparent" as possible to the user. In other words, each user should be able to communicate with any computer, device, or other user terminal on the network without concern for the nature of the bus, the message formats used, or the physical location or address of the intended destination. Furthermore, a bus interface unit should ideally be small in size and relatively inexpensive, unlike most of the units that have been available for similar purposes. The present invention meets or exceeds these ideal requirements.

SUMMARY OF THE INVENTION

The present invention resides in a bus interface unit for use in connecting one or more digital devices to a local-area computer network. Of the various novel aspects of the invention, one of the most important is its ability to cooperate with another bus interface unit connected to the network and establish a virtual communication link between two devices, such that no other device can communicate with either of the linked devices until the virtual link is broken. Significantly, a device originating a virtual link with another device need refer to the other device only by an assigned name, which is totally independent of the device's physical address or identification.

Basically, and in general terms, the bus interface unit of the invention is for use in a local-area computer network having a communication bus and a plurality of user devices connected to transmit and receive information over the bus. The bus interface unit of the invention comprises means for connecting the unit to a plurality of user devices, each of which is capable of transmitting information to or receiving information from the unit, and means for connecting the bus interface unit to the communication bus through a plurality of logical ports. Most importantly, the unit also includes logical switching means for each user device, switchable between a command mode in which information from the user device is not passed to the bus, and a connected mode in which information from the user device is passed to the bus through its corresponding logical port, and information received from the bus through the same logical port is passed to the user device.

More specifically, the bus interface unit also includes means for processing commands received from each of the user devices, means for use when the bus interface unit is functioning as a calling unit, for transmitting the name of a called bus interface unit to all other bus interface units in the network, and means for receiving an acknowledgement message from a called bus interface unit with a name matching the transmitted name, and for transmitting a connect request to the called bus interface unit. The logical switching means then functions in response to the receipt of a connect request acknowledgement message from the called bus interface unit and switches to the connected mode, whereby the calling and called devices are then logically connected for the transmission of further data messages.

From the standpoint of a recipient of a call, the bus interface unit includes means for transmitting an acknowledgement if the received name matches the name of the unit, and means for transmitting a connect request acknowledgement if a port is available for connection to the calling device. If connection can be made, the logical switching means in the recipient bus interface unit is then switched to the connected or data mode to establish the logical connection between the calling and called devices.

Once a logical link has been established as described above, another novel aspect of the interface unit is that the calling unit may establish a two-way conversational connection between the linked devices, whereby the logical switching means of the calling unit is placed in a mode known as the talk mode. In the talk mode, information entered into the calling device is transmitted automatically to the called device whenever a selected character is encountered in the entered information, and information entered into the called device is likewise transmitted automatically to the calling device whenever the selected character is encountered in the entered information. More specifically, the interface unit when used as an originating unit further includes first storage means for temporarily holding information entered into the calling device, and second storage means for temporarily holding information entered into the called device. Also included is means responsive to the detection of the selected character in the stored information, for transmitting the contents of the first storage means to the called device and transmitting the contents of the second storage means to the calling device.

In accordance with another aspect of the invention, the logical switching means of the bus interface unit is also switchable on command to a remote mode, in which a local device is connected through the bus to another bus interface unit, which may then be remotely commanded to perform a number of selected functions. In this manner a bus interface unit may be completely unattended and controlled from a different location. Once in the remote mode, a bus interface unit may be commanded to leave a message for a remote user. For this purpose, each bus interface includes storage means for holding such messages, any of which may be received from other interface units operating in the remote mode, and a visible indicator automatically actuated when the storage means contains a message. Each bus interface unit also include means for retrieving messages from the storage means. In one mode of operation the means for retrieving messages is operable only after entry of a specific password, so that privacy of personal messages may be maintained.

In terms of a novel method, the invention in its broadest sense includes the steps of establishing a communication link between a calling and a called device by switching a logical switching means in each bus interface unit into a connected mode. More specifically, the steps of establishing the link include sending from the originating bus interface unit a broadcast message containing the designated name of the called bus interface unit, sending from a recipient bus interface unit an acknowledgement message indicating that the recipient bus interface unit is available for connection to an acceptable device, sending from the originating unit a message requesting that a logical connection be made, sending from the recipient unit an acknowledgement of the connection request, if connection can then be made, and switching the logical switching means in each unit to a connected mode indicating that the communication link has been completed. In accordance with another important aspect of the invention, part of this exchange of messages takes place without relinquishing control of the communication bus to any other user seeking access to it.

As mentioned above, a conversational "talk" mode is also an important aspect of the invention. When this mode is requested by an originating device, the logical connection is established as described above; followed by the steps of switching the logical switching means in the originating unit to the talk mode, in which information entered into the calling device is echoed back to that device character by character, but is also transmitted to the called device whenever a special character, such as a carriage return, is encountered. Information entered into the called device is transmitted to the originating bus interface unit, where it is echoed back to the called device and also sent to the calling device line by line whenever the special character is encountered. In this manner, everything entered into the calling device is viewed line by line on the called device, and vice versa.

In operating a bus interface unit remotely, the method steps include switching the originating bus interface unit into remote mode, and entering further commands at the originating end, to be executed by the remote unit, which functions in the same manner as if it were executing commands entered through one of its local devices. One of the commands entered remotely may be a message command. On receiving the message command the unit stores an accompanying message in a storage area and activates an indicator to advise the user that a message has been entered. The user may retrieve any stored messages by accessing the bus interface unit with a "view" command. If any message has been transmitted using a command that preserves privacy, the view command has to be preceded by an "open" command, with which the user must supply the correct password for access to the messages. Messages transmitted on an open basis are termed announcements and may be accessed without a password.

It will be appreciated from the foregoing that the present invention represents a significant advance in the field of local-area computer networks. In particular, the invention provides a novel technique for logically connecting two user devices, or a user device and a computer, in such a manner that the linkage may be established without knowledge of the physical address or physical identifying codes of the called device, and may be maintained without interruption until the linkage is broken. In addition, the invention allows the establishment of a conversational talk mode between two user devices, without the intervention of a host computer to monitor or relay the messages. Finally, the bus interface units of the invention may be accessed and operated remotely, for unattended operation or for storage of messages intended for a user who is temporarily absent from the device location. These and other aspects and advantages of the invention will become apparent from the following more detailed description, taken in conjunction with the accompanying drawings.

BRIEF DESCRIPTION OF THE DRAWINGS

FIG. 6 is a simplified hardware component block diagram of the bus interface unit of the invention;

FIG. 7 is a more detailed block diagram of a portion of the bus interface unit hardware of FIG. 6, showing in particular the relationship of the synchronous data link control (SDLC) logic to the other hardware components;

FIG. 12 is a state diagram illustrating operation of the bus interface unit in transmitting a message using normal contention protocols;

FIG. 13 is a state diagram illustrating operation of the bus interface unit in transmitting an immediate acknowledgement message;

FIG. 14 is a state diagram illustrating operation of the bus interface unit in receiving a connection request message and a disconnection request message;

DESCRIPTION OF THE PREFERRED EMBODIMENT

Figure 1:
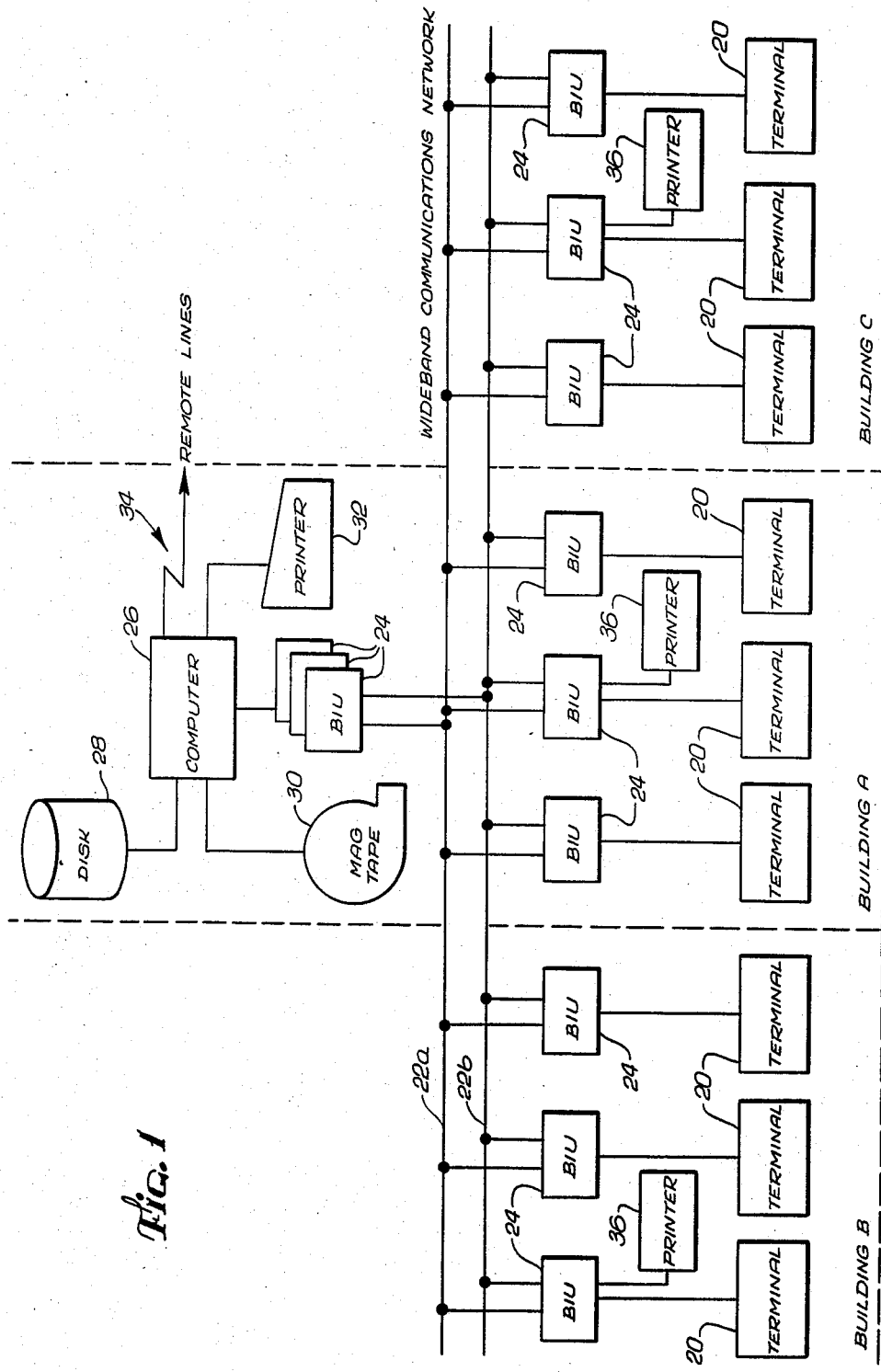
FIG. 1 is block diagram of a local-area computer network of typical configuration, incorporating bus interface units in accordance with the invention.

As shown in the drawings by way of illustration, the present invention is principally concerned with improvements in the field of local-area computer networks. In particular, the invention relates to improvements and simplifications, from a user standpoint, relating to the manner in which user devices are interconnected in the network, and improvements in the types of communication modes that are available to a user without the support of a host computer connected to the network.

Local-area Network Description

Figure 2:
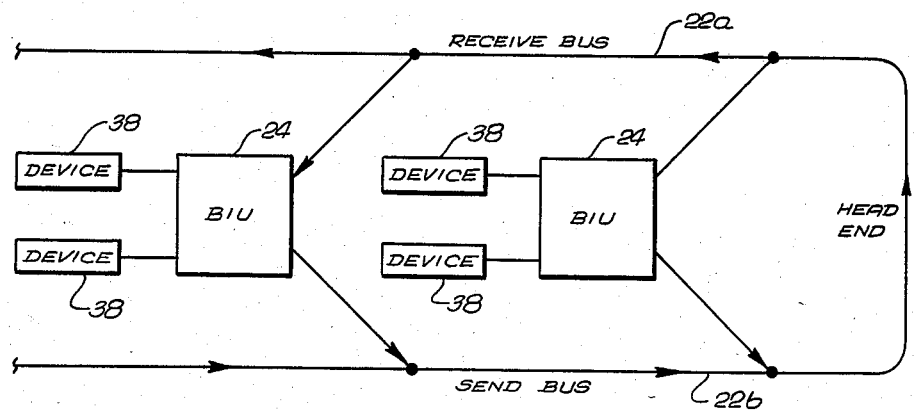
FIG. 2 is a simplified, fragmentary block diagram showing the connection of two bus interface units to a sending bus and a receiving bus of a local-area computer network.

FIGS. 1 and 2 show the type of network environment in which the invention operates to advantage. As shown in FIG. 1, the typical network includes a plurality of user terminals, indicated by reference numeral 20, located at various sites that are usually in a relatively small geographic area, such as in one building or a group of buildings occupied by a single company or organization. The communication link connecting the terminal is a bus 22, to which each terminal 20 is connected through a plurality of bus interface units 24. In fact, each bus interface unit (which will now be referred to only by its abbreviation BIU) is connected to a sending bus 22a and a receiving bus 22b, but as shown in FIG. 2, the sending and receiving buses are joined at what is referred to as the head end of the bus, which may include an amplifier.

The bus 22 may take a variety of forms, but in the presently preferred embodiment of the invention, the bus is a broadband coaxial cable and the messages are transmitted in the form of an amplitude-modulated radio-frequency carrier signal. This choice has the advantage of allowing the use of standard, relatively inexpensive cable-television technology for much of the bus equipment. In addition, since only a portion of the bandwidth of the cable is used for digital communications, the cable may serve other purposes in some applications. For example, closed-circuit television signals may be also transmitted over the network between remote locations.

Also connected to the bus 22 in the typical configuration is a mainframe computer 26, which may employ more than one BIU 24 in connecting to the bus, to provide computer access for multiple concurrent users. The computer 26 will, of course, be connected to the usual range of peripheral devices, such as a magnetic disk drive 28, magnetic tape drive 30, and a high-speed printer 32. The computer 26 may also be connectable to communication lines, as indicated at 34, for exchange of information with remotely located computers. Some of the user sites may also have printers 36 available to them, although it is not usually economical to support every site with printing capability.

In many applications, the computer 26 acts as a "host" to the user terminals 20, any of which may connect to the computer in order to access a large data base or to control the execution of programs in the computer. In some systems, the computer 26 also acts as a host for the collection and distribution of "electronic mail," a term that is intended to cover all forms of user-to-user communications. In prior networks of this general type, communication with another device on the network is established by means of a calling sequence in which the destination device must be addressed by some form of hardware identifier, which sometimes relates to the settings of switches on each BIU 24.

To reduce complexity and cost, each BIU in networks prior to the present invention is associated with only one user device. As shown in FIG. 2, each BIU 24 of the invention may have connected to it more than one user device, indicated by reference numeral 38. FIG. 1 shows that one of the devices may be one of the printers 36, which may then be independently accessed from another device. In the embodiment described in this specification, two devices 38 may be connected to each BIU 24, but the BIU is designed for easy expansion of the number of user devices per BIU.

In accordance with one important aspect of the invention, each BIU 24 in the network may be addressed by a simple name, the assignment of which may be readily changed by a user. As will be discussed in detail, a communication link may be established by the simple expedient of typing such a command as CALL SMITH, BILL at a user terminal. Data may then be transmitted to Bill Smith's terminal. Connection with a computer can likewise be established by keying in a command such as CALL COMPUTER, A. Even more powerful is a conversational mode established by keying in a command such as TALK SMITH, BILL. In this mode of operation, everything keyed in at one of the linked terminals appears on the screen of the other, and a conversion may take place without the entry of further commands. Importantly, the talk mode functions without the help of a host computer. It is purely a user-to-user communication mode.

Another novel feature of the invention is a command that allows a user to control remote and unattended device from his own terminal. When the command REMOTE is entered, together with the name of another user device, the BIU at that device becomes controllable by the user who gave the REMOTE command. With this feature at his disposal, a user can, for example, connect a remote unattended terminal with a printer at a third site.

Yet another novel feature is the ability to leave a message at another user site, either a private message or a non-private "announcement," and again without using a host computer for this form of electronic mail. Access to a private message left for a user requires a special user password.

These and other aspects of the invention will now be discussed in more detail. However, some preliminary discussion of the hardware configuration of each of the BIU's 24 is first necessary.

The Hardware Configuration

As shown in FIG. 6, the major components of the BIU 24 are central processor unit (CPU) logic 40, input-/output (I/O) logic 42, direct memory access (DMA) logic 44, synchronous data link control (SDLC) logic 46, a random-access memory (RAM) 48, a read-only memory (ROM) 50, and an electrically erasable programmable read-only memory (EEPROM) 52. These logic modules communicate with each other over a system data bus 54, a system address bus 56 and a system control bus 58.

The CPU logic 40 is of conventional design and includes a Z80A CPU (a Zilog 4 MHz 8-bit microprocessor) and a standard Zilog counter/timer circuit (CTC). The I/O logic 42 includes a standard Zilog Z80A dual asynchronous receiver/transmitter (DART) chip, which is coupled to two serial I/O ports indicated at 60 and 62. The DMA logic 44 includes a Zilog Z80A DMA control chip, which handles all data transfers between memory and the SDLC logic 46, without involving the CPU logic 40. The SDLC logic handles data transfers to and from the communication bus 22, and also includes other control logic discussed in more detail with reference to FIG. 7. The memory devices are also conventional, including the RAM 40, which in the illustrative embodiment includes 6,144 bytes (6k) of memory comprising three RAM circuits with part no. M58725. The ROM 42 includes 12k bytes of memory, comprising three circuits with part no. 2732A. Finally, the EEPROM 52 comprises 2k bytes (part no. 2815), and is used for storing information that may be changed but is not to be lost when power is turned off. For example, BIU names and locations are stored in the EEPROM 52, using EEPROM write control logic 64. The ROM 50, of course, contains the programs and control logic necessary to perform the BIU functions to be described, while the RAM 50 is used for temporary data storage.

Not shown in FIG. 6 is a modem (modulator/-demodulator), which is connected to the SDLC logic 46 over lines 66. The modem transmits message packets over the communication bus 22 by amplitude-modulating a radio frequency carrier signal, and receives messages packets by demodulating the received carrier. In addition, the SDLC logic 46 also exercises some control over the DMA logic 44, as indicated by line 72.

FIG. 7 shows the SDLC logic in more detail, including a standard SDLC chip 74 (part no. WD1933B-02 manufactured by Western Digital), a first-in-first-out chip 76 (Zilog 128-byte FIO chip, part no. Z3038), and a bi-directional bus driver 78 (part no. 74LS245) connected between the system data bus 54 and a local data bus 79. Basically, the FIFO circuit 76, which is also interposed between the local data bus 79 and the system data bus 54, acts as a buffer mechanism between the SDLC and DMA chips, so that these two circuits can run asynchronously. The SDLC logic 46 also includes an array of discrete logic elements, indicated by reference numeral 80, which in turn includes DMA control logic 82, data transfer control logic 84, bus arbitration logic 86, end-of-packet detection logic 88, and I/O decoding logic 90. The bus arbitration logic 86 controls use of the local data bus 79, as well as the direction of data transfer in the bus driver 78, as shown by control line 92. Data flow between the SDLC chip 74 and the FIFO chip 76 is controlled by the bus arbitration logic 86 and the data transfer control logic 84, and data flow between the FIFO chip and the RAM 48, bia the DMA logic 44 and the system data bus 54, is controlled in part by the data transfer logic. The CPU logic 40 can send control information to the SDLC chip 74 through the bus driver 78 and the local data bus 79, and status information from the SDLC chip can be sent to the CPU logic over the reverse path, again under control of the bus arbitration logic 86.

In addition to its functions described above, the local bus 79 is also used to transmit CPU control information to a system control I/O port 93. This is used to generate miscellaneous I/O control signals to the EEPROM 64 and to audible and visible indicators on the bus interface unit.

The bus arbitration logic 86 and the end-of-packet detection logic 88 also communicate with the CPU logic 40 over a CPU wait line 94 and a CPU nonmaskable interrupt line 96, the latter being used to notify the CPU logic of completion of either an outgoing data transfer through the SDLC chip 74, or an incoming data transfer from the SDLC chip to memory. The I/O decoding logic receives address and control information from the system address bus 56 and system control bus 58, and provides I/O control signals on lines 98, also used in the control of various input and output operations. The entire discrete logic array 80 is implemented in the form of three logic array chips, two having part no. PAL1018 and the other having part no. PAL16R6.

The detailed logic design of the hardware elements shown in FIGS. 6 and 7 is not in any way critical to the invention as claimed, and other design approaches might be employed to couple the BIU to the communication bus 22 and to local device ports. For the sake of completeness, however, complete schematic diagrams of the hardware are included in Appendix I to this specification.

Overview of Modes of Operation

The BIU of the invention provides each user with a convenient interactive technique for communicating with other users or computers connected to the network. The basic or default mode of the BIU is the command mode. It should be remembered throughout the descriptions that follow that the "mode" or "state" refers not necessarily to a BIU but to a logical portion of the BIU that is handling a particular device connected to the BIU. The BIU may, for example, be in the command mode with respect to device #1 and in a data mode with respect to device #2.

In the command mode, the BIU receives and interprets information entered into the user device, checking to determine whether any of the information contains one of its list of valid commands. In this mode, the user is communicating with his local BIU and not with the communication bus 22. When a command is recognized by the BIU, it takes appropriate action to comply with the command. Some of the commands are merely requests for status information that can be immediately supplied to the user terminal. For example, a status command, STAT, provides the user with the current status of the BIU to which his device is connected. Other commands are used to modify various parameters relating to the BIU. For example a NAME command is used to assign or modify a user's name, and a LOCATION command is used to enter or modify a user's location. After any of the foregoing commands, the requested action is taken by the BIU and control is returned to the user in command mode.

The commands with which the present invention is principally concerned, however, are those of the type that place the BIU in a different mode of operation. There are three other modes of operation that are of interest: data mode, talk mode, and remote mode. In data mode, the local user device is logically connected to another device, usually a computer, but in some instances another user device. In data mode, the logical connection is initiated by an originating device, and information subsequently entered into or originating from the originating device is treated as data to be transmitted to the device with which the logical connection has been established. A CALL command is used to establish the initial connection and effect transition to the data mode.

In accordance with an important aspect of the invention, the only parameter needed for the CALL command is the assigned name of the intended destination BIU. Each BIU in the network actually has four names, including a first and last name, a location name and a BIU name, which is the serial number of the device. The CALL command may use any two of these four names, and typically uses the first and last names. For user terminals, the first and last names can be conveniently selected to be the first and last names of the users themselves. For computers, the names can be well known computer names identifying the computers, such as VAX, IBM and so forth.

In the talk mode, a logical connection is established as in the CALL command, and then additional changes are made to the BIU logic, to establish an interactive link with the called device, which is usually another user terminal. In the talk mode, any information entered by the calling user is automatically displayed at called user's terminal, and any information entered by the called user is auomatically displayed at the calling user's terminal. In this manner, a two-way conversation can be carried on, all without the intervention of a host computer.

In the remote mode, which is entered by giving the REMOTE command, a user can access a remote BIU as if it were his own. When used in conjunction with the CALL command, REMOTE allows one user to interconnect two devices at second and third sites, which may be unattended. When used in conjunction with the remote mode, a message command (MESS) allows a user to store a message at a remote BIU, for later viewing by a user at the remote site. Access to the message can be gained only by using an OPEN command, which requires entry of a user password, followed by a VIEW command, and terminated by a CLOSE command.

The manner in which these functions are performed will be discussed in the following descriptive sections. Functioning of the BIU can be discussed at a number of different levels of operation. Basically, it is the CPU logic 40 that controls the various functions under the control of a set of programs of instructions stored in the ROM 50. A listing of these programs is provided in Appendix II. However, it will be appreciated that the programs are necessarily complex in structure, since the CPU must perform a number of functions, such as input and output, in a practically simultaneous manner. For this reason the programs are structured as a number of separate tasks that share the the CPU under the control of a task swapping program that switches from one task to another in rapid succession. Further complicating the program structure are a number of program segments that are executed in response to interrupt signals provided to the CPU logic, to indicate, for example, that a data packet has been transferred onto the bus or has been transferred into memory from the bus. The program task structure will be described later, since it does not serve as a convenient vehicle for explanation of the invention.

Operation of the programs embodying the invention will instead be explained at a functional and sequential level rather than focusing on the specific program code. Each principal command will be explained with reference to a flowchart of the sequence of functions involved, and with reference to a logical table structure manipulated by the programs. Operation of the BIU will also be discussed using logical state diagrams, which provide a useful aid in visualizing the effect on each BIU during various steps in the command sequences.

Figure 3:
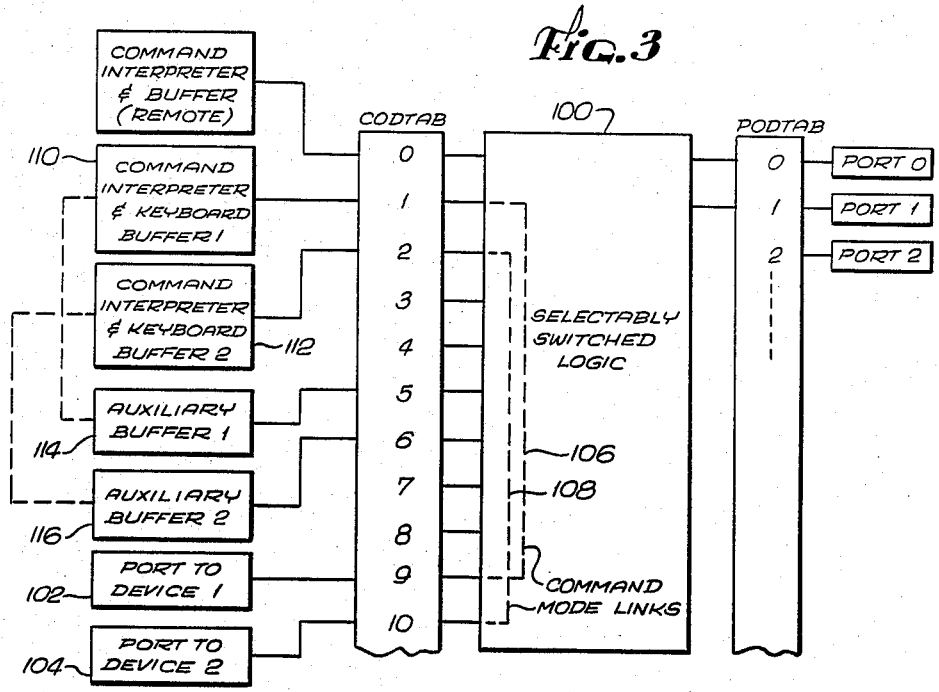
FIG. 3 is simplified block diagram of a logical switching arrangement that is key to the operation of the bus interface unit of the invention.

A logical table structure is manipulated by the programs to establish desired connections between devices, logical bus ports, and processing tasks, and to maintain and subsequently dismantle these connections. An understanding of this table structure, at least in logical terms, is essential to an appreciation of the functions of the CALL, TALK and REMOTE commands, and combinations of these and other commands. The table structure is shown in simplified form in FIG. 3, as including a character-oriented table, indicated as COD-TAB, a packet-oriented table, indicated as PODTAB, and selectably switched logic, indicated at 100. The structure of the tables will not be described in detail, and is available in the listing of Appendix II. Suffice it to say, however, that the two tables and the switched logic 100 together establish various data paths through the BIU.

Entries #9 and #10 in the CODTAB, referred to as COD-9 and COD-10, respectively, are logically linked to two local I/O ports, indicated at 102 and 104, respectively, for two local devices. When in the command mode, the only linkages provided by the switching logic 100 are the command mode links indicated by broken lines 106 and 108. Link 106 connects COD-9 with COD-1 and link 108 connects COD-10 with COD-2. Logically connected with COD-1 is a command interpreter module 110, which has a keyboard buffer associated with it. Each of the links 106 and 108, and in fact each of the other links to be described in relation to the switched logic, may be considered as a bi-directional data path. Thus, when the user at device #1 sends characters of information through port local I/O 102, each character is transmitted over link 106 to the command interpreter 110. One of the functions of the interpreter is to initiate an "echo" transmission of each received character back to its source, in this case over the link 106 to the originating device. As a result, the user will see the characters he enters displayed on the screen of his terminal. The interpreter 110 also functions to store the received characters in the keyboard buffer, and to interpret the received information and take appropriate action if the information constitutes a command.

Basically, the information or data are not moved at all in effecting data transfers in the tables, over lines such as the link 106. Rather, pointers in the tables are modified to reflect apparent movement of the data.

Associated with COD-2 is another command interpreter 112, performing an identical function to the other interpreter 110, but for information received over link 108 from port 104 to device #2. In fact, the two command interpreters 110 and 112 are implemented in the form of a single program. However, the program is designed to be "re-entrant," meaning that it may be called or entered from more than one calling program, without waiting for completion of any previous calls. This presents the appearance of the availability of multiple copies of the same program. Associated with COD-5 and COD-6 are two auxiliary buffers 114 and 116, respectively, under the command interpreters 110 and 112, as indicated by the broken correcting lines. These auxiliary buffers are used only in the TALK command, to be discussed. There is also yet another command interpreter 118 and associated buffer logically connected to COD-0. This is used only in relation to the REMOTE command.

Thus far in discussing the CODTAB and PODTAB tables, only the command mode has been considered, and no connections with the PODTAB have been discussed. The PODTAB also contains a plurality of entries, of which only #0, #1 and #2 are shown. Entries #1 and #2 are connected to logical bus ports #1 and #2, respectively. Port #1 is the port through which device #1 accesses the bus, and port #2 is the port through which device #2 accesses the bus. In accordance with the connections to be described for various commands, the switched logic 100 may be modified to include linkages from a CODTAB entry to a PODTAB entry, to connect a device to its output port.

The CALL Command

The CALL command establishes a logical connection between a calling device and a called device. The logical connection is stored in the CODTAB and PODTAB entries in the BIU's at both ends of the connection. However, before the table entries are modified to record the connection, there is an exchange of messages between the calling and called BIU's, first to locate the called device, then to attempt a connection with it. Before the nature of these messages can be discussed, it is appropriate to digress to define the format of a message packet used in transmitting data and control messages over the communication bus.

Figure 4:
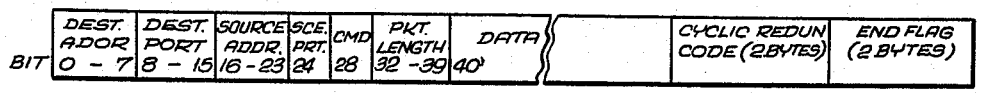
FIG. 4 is a diagram showing the format of a data packet used for transmission of data and control messages in the local-area network.

The message packet format is shown in FIG. 4. It includes a field for a destination address, defining a unique BIU, and a destination port within a BIU. Some messages will be broadcast to all destinations, in which case the destination address will be all zeroes. The packet also includes fields for a source address and source port within the source BIU. Then there is a command field indicating the type of information contained within the packet, a packet length field, and a variable-length field for data to be transmitted. Finally there is a field for a cyclic redundancy code for error checking purposes, and a two-byte field for an end-of-packet flag.

The various types of information that may be contained in a packet are given by the following table, each entry in which has a unique command code for entry in the message packet command code field:

| Mnemonic | Message Type |
| --- | --- |
| ACK | Acknowledge data |
| WAC | Wait-acknowledge |
| NAC | No-data acknowledge |
| CRA | Connect-request acknowledge |
| CAB | Connect-acknowledge busy |
| QAA | Query acknowledge acknowledge |
| NRA | Name request acknowledge |
| DIS | Disconnect |
| QBN | Query-by-name |
| RSM | Resume with data |
| DAT | User data packet |
| CRQ | Connect request |
| NRQ | Name request |
| QNA | Query name acknowledge |

The purpose of each type of message will become apparent as the description of each command proceeds, especially in relation to the state diagrams.

The CALL command will now be described with reference to the flowchart of FIGS. 8a-8c. The CALL sequence is entered as shown at 120. The normal CALL command assumes that the caller does not wish to be connected to a specific port of the called BIU. Typically, the user will use CALL to connect with a computer or to reach a user who has his own BIU. In the computer situation, the user has no preference for which port is employed to access the computer. A variant of the CALL command is the PCALL, as shown at 123, which requires the caller to specify which port he wishes to connect to. This might be used, for example, when a user wishes to connect his terminal to a printer located at a remote site and connected to the bus through a specific BIU port. In any event, for a plain CALL, parameters are set to select any port, as shown at block 122, and for a PCALL the parameters are set to select a specific port, as indicated at 124. It happens that the REMOTE command, indicated at 125, is also a variant of the CALL, and that the parameters are then set for the selection of port #0, as indicated at 126. The effect of the REMOTE command is discussed in more detail below.

Figure 8A:
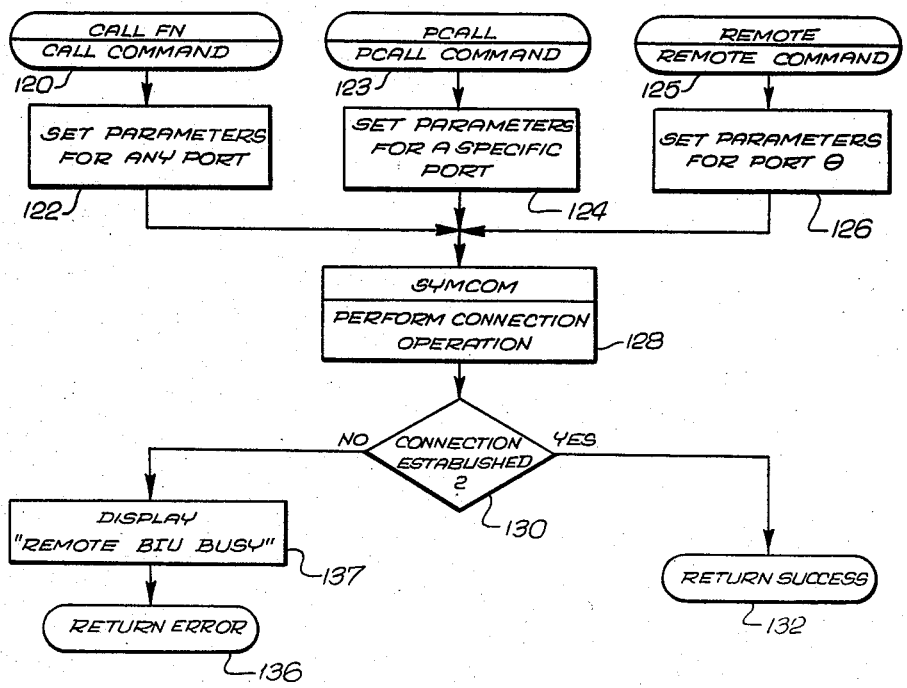
FIGS. 8a-8c together comprise a flowchart defining the sequence of functions performed by the bus interface unit in response to a CALL command, a PCALL command and a REMOTE command.
Figure 8C:
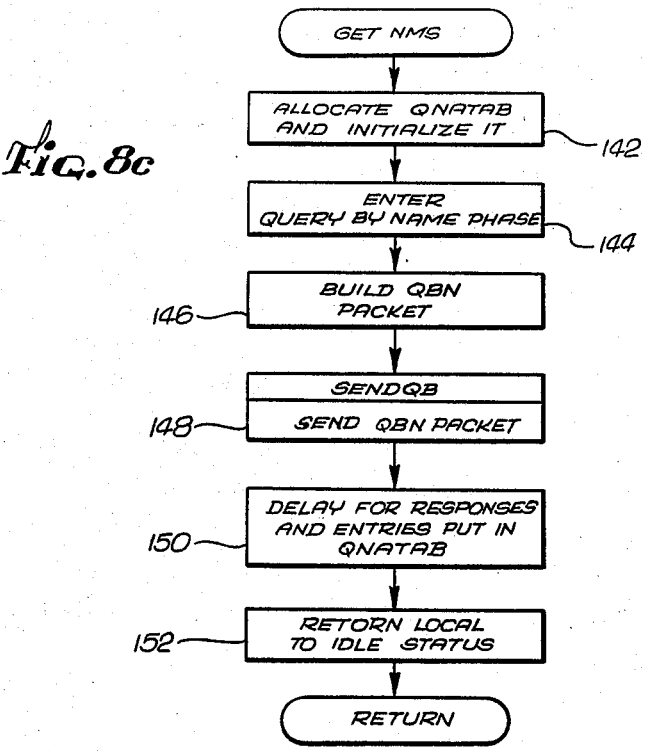
Figure 8B:
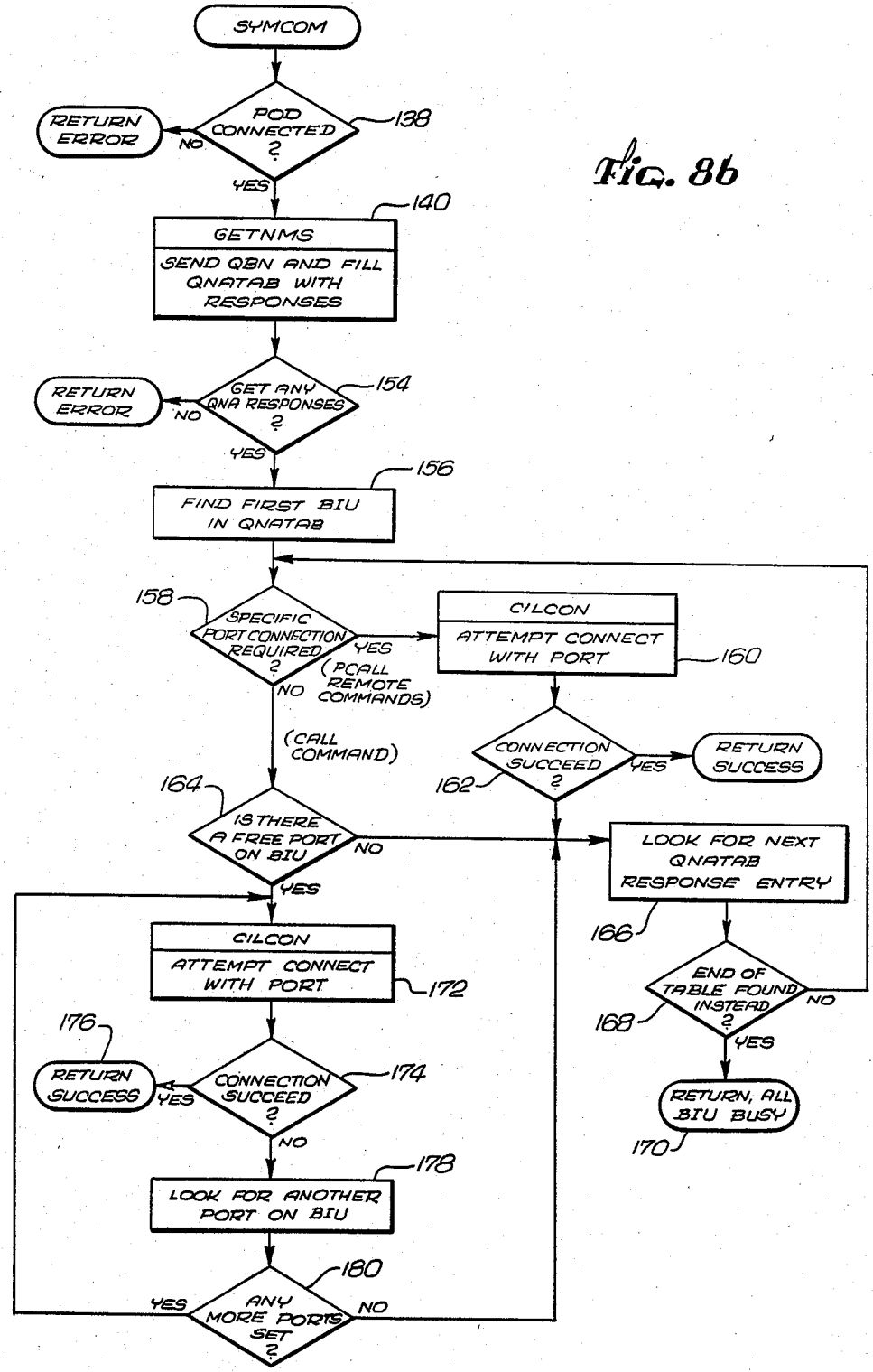

Each form of the CALL command next requires that a connection be performed, as indicated by the block 128, which is expanded in FIG. 8b, describing a subroutine named SYMCOM. After return from SYMCOM if a successful connection was made, indicated by an affirmative answer to the question posed in block 130, a successful return is made from the call sequence, as indicated at 132. If the connection was unsuccessful, a message indicating that the remote BIU is busy is displayed to the caller, as indicated at 134, and an error return is made, as indicated at 136.

The connection process is shown in more detail in FIG. 8b, which first asks, in block 138, whether a POD-TAB entry is connected to a port to the bus, and then enters at 140 a subroutine called GETNMS to obtain the names of any BIU's matching the names given as parameters in the CALL command. GETNMS is shown in detail in FIG. 8c. The sequence is to first allocate a table area for receipt of responses, in block 142, then enter a query-by-name phase (block 144), build a query-by-name message packet (block 146), transmit the packet (block 148), place any responses in the allocated table (block 150), and return the calling BIU to an idle status (block 152) before returning to the calling program.

Back in the SYMCOM subroutine, a check is made to determine whether any responses were received to the query-by-name message (block 154). If none were received, an error return route is taken, but if there were any valid responses the first is retrieved for further processing (block 156). Up to this point, the calling BIU has transmitted a broadcast query-by-name (QBN) message to all other BIU's on the network, and has received one or more replies from BIU's that have names matching those specified in the CALL command. Where several BIU's are connected to a single computer, they will be assigned the same name, which gives rise to one situation in which there could be multiple replies to a QBN message. The calling BIU saves the source addresses of all of the QNA (query name acknowledge) responses and sends off an immediate QAA (query acknowledge acknowledge) in each case.

In decision block 158 of FIG. 8b, it is determined whether connection to a specific port is required. If so, indicating a PCALL or REMOTE command, an attempt is made to connect with the required port (block 160), and if successful (block 162) a successful return is made from the SYNCOM subroutine. The attempt to connect to the port, in block 162, basically involves the transmission of a connect request (CRQ) message to the remote BIU, which then has to check a field in the appropriate PODTAB entry to determine whether connection to another BIU has already been made. The remote BIU transmits either a connect request acknowledge (CRA) message if the port is available, or a connect acknowledge busy (CAB) message if the port is unavailable. If the required port is busy, as determined in block 162, or if there is no free port available for a CALL command, as determined in block 164, the next entry in the table of successful name matches is retrieved (block 166), and control is transferred to block 158 again to try to establish the connection. If there are no more entries in the table (block 168), a return is made indicating that all ports are busy, as indicated at 170.

In processing the CALL command at block 164, if a port is available an attempt is made to connect to it (block 172), and if successful, as determined in block 174, a successful return is made, as indicated at 176. Otherwise, a search is made for another port on the same BIU (block 178), and control is transferred back to block 172 to attempt another connection. If all of the ports have been tried (block 180), control is transferred to block 166 to look for another BIU table entry.

An important part of the CALL command sequence takes place when a successful connection has been made to a remote BIU. At this point the CODTAB and POD-TAB entries at both originating and recipient BIU's are changed to establish the logical connection between the called and calling devices. This is shown for the CALL in FIG. 5a. In the originating BIU, a connection is made between COD-9 and POD-1, indicating that device #1 is logically connected to its bus port (#1). Contained within the POD-1 entry is the BIU address and port number of the recipient of the CALL. This is essentially a POD to POD entry in the table, as indicated by the broken lines between POD-1 of the originator BIU and POD-2 of the recipient BIU. It is assumed, by way of illustration only, that connection was made to the second port at the recipient BIU, either because there was a PCALL command specifying that port, or because it was the only available port.

Figure 5A:
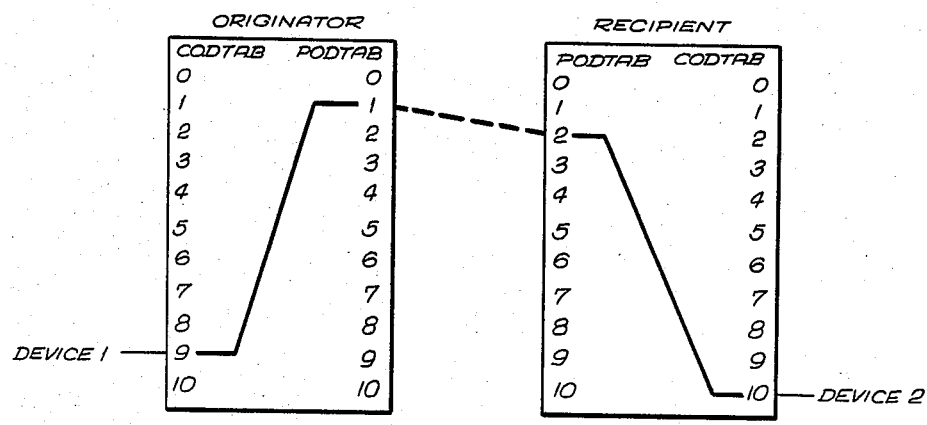
FIGS. 5a-5c are diagrams illustrating the logical connections made in connection tables of originating and recipient bus interface units, for data mode, talk mode, and remote mode, respectively.

Note that the command mode link between COD-9 and COD-1 no longer exists in FIG. 5a after the CALL. Data entered into device #1 of the originator BIU will be transferred over the established call linkage to device #2 of the recipient BIU. The protocols for data transfer are discussed below in relation to FIGS. 16 and 17.

The TALK Command and Mode

Figure 5B:
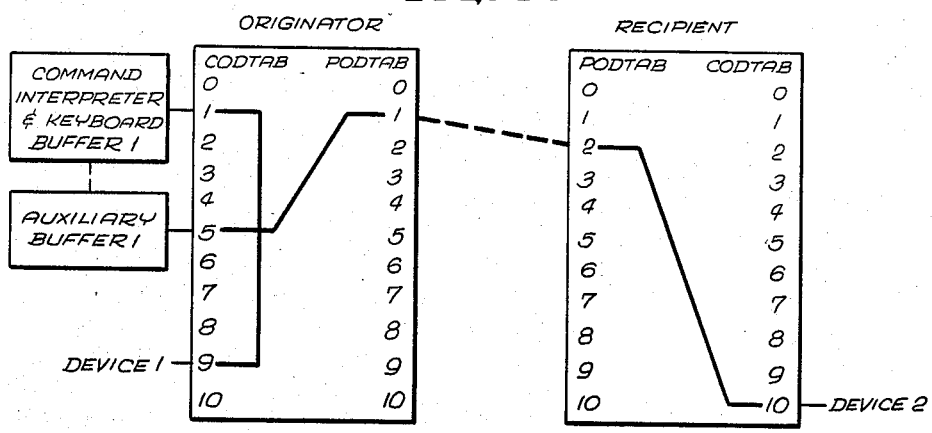
Figure 5C:
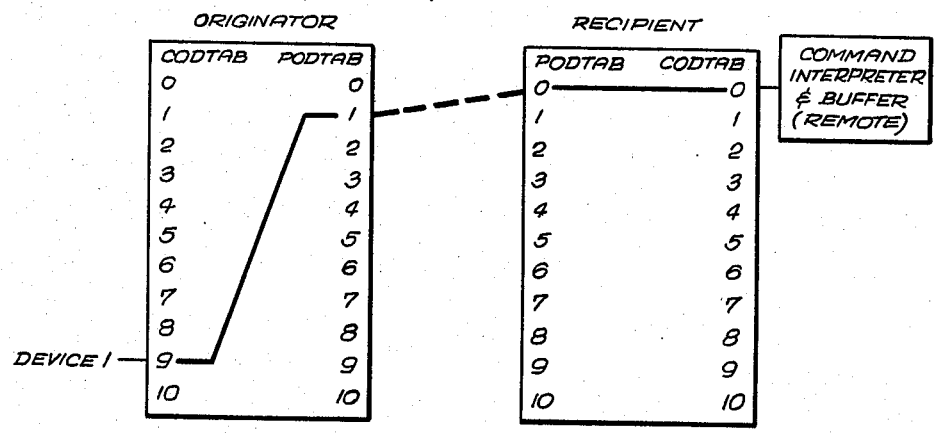
Figure 9A:
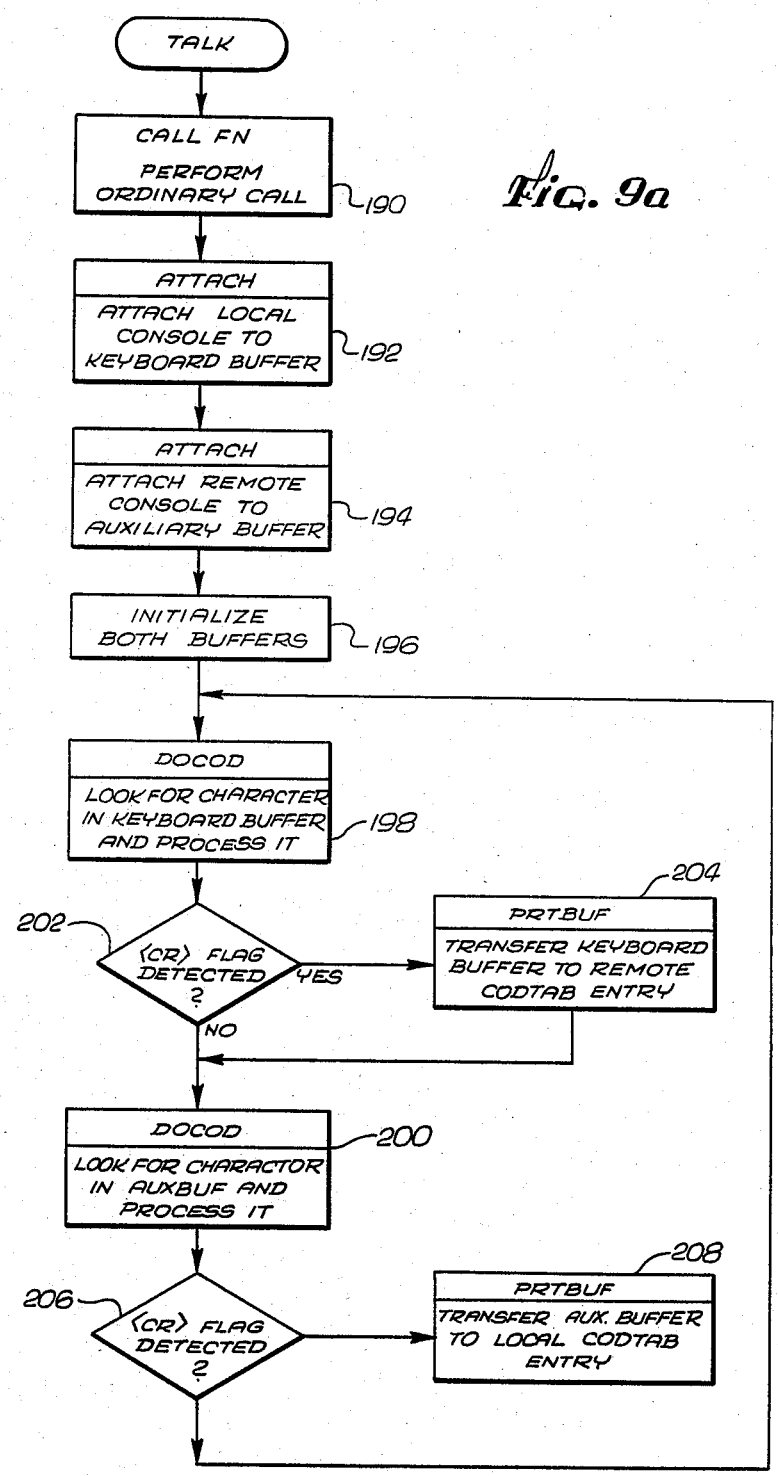
FIGS. 9a and 9b together comprise a flowchart defining the sequence of functions performed by the bus interface unit in response to a TALK command.
Figure 9B:
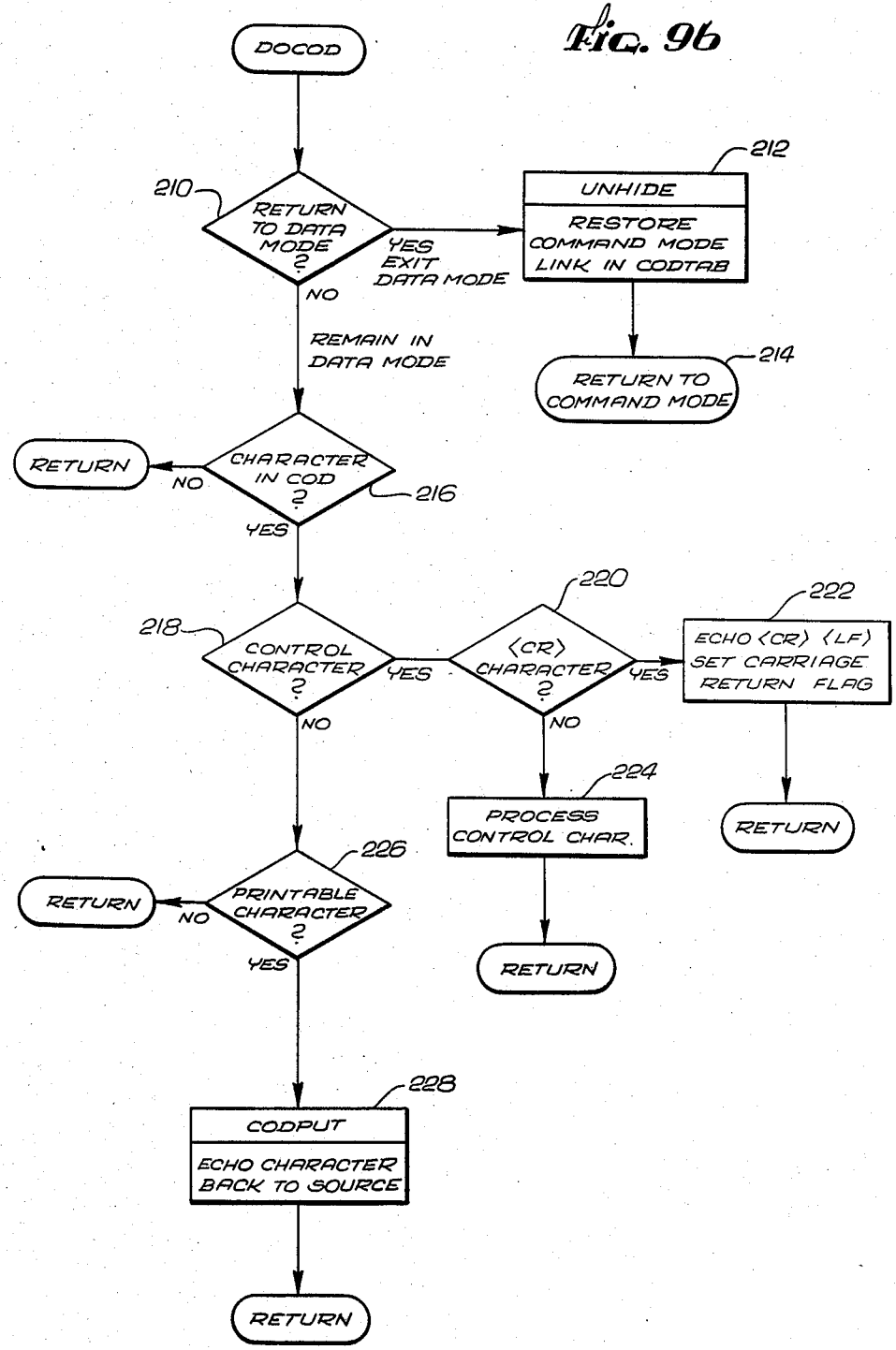

Now that the CALL command and the sequence of operations it initiates have been described, the power of the TALK command can be better appreciated. As shown in the flowchart of FIGS. 9a and 9b, the TALK command sequence begins by initiating an ordinary CALL command, as indicated at 190. Next there are two calls to a subroutine named ATTACH, at 192 and 194. The first ATTACH call at 192 has the effect of removing the CALL linkage established in the originator BIU, and establishing an alternate linkage. In the example of FIG. 5, the CALL linkage between COD-9 and POD-1 is first removed and a new linkage is made between COD-9 and COD-1. It will be recalled that this is the command-mode link shown in FIG. 3, and that COD-1 has a command interpreter and keyboard buffer associated with it. The second ATTACH call, at 194, has the effect of making a connection between POD-1 and COD-5, which, it will be recalled, also has the command interpreter 110 associated with it, together with the auxiliary buffer 114. Both buffers are initialized in block 196, then the characters entering the buffers are examined one by one and echoed back to their respective source devices. For example, a character from the local device is placed in the keyboard buffer and echoed back to the local device, over the COD-1 to COD-9 link. Likewise, a character from the remote device reaches the auxiliary buffer over the POD-1 to COD-5 link and is echoed back to the remote device over the same link. The connections at the recipient BIU are the same for TALK as they are for CALL.

Action of the command interpreter 110 operating in TALK mode is diagrammed by the remainder of the flowchart of FIG. 8a. Character by character examination is effected by calls to a subroutine named DOCOD, at blocks 198 and 200. If a carriage return character is detected in the keyboard buffer (block 202), a call is made, in block 204, to another subroutine (PRTBUF), whose function is to transmit the entire buffer to the other device, i.e. to the remote device. This function is performed by manipulating the table entries and pointers again. In effect, a line of information in the keyboard buffer is transferred by the command interpreter 110 to the COD-5 entry point to the tables; and then passes over the link already established from COD-5 to POD-1, to reach the remote device.

Similarly, when a carriage return character is detected in the auxiliary buffer (block 206), a call is made to PRTBUF (block 208) to dump an entire line of the buffer to the local device. In this case, information in the auxiliary buffer 114 is transferred to COD-1, and thence over the link established to COD-9 and the local device. By now it will be understood that, once the TALK linkages have been established, the local user at the originator BIU may "talk" to the remote user device by simply keying in a message. After every carriage return, a line of the message will be transmitted to the remote device. In a similar fashion, each line that the remote user enters will appear at the local device.

FIG. 9b shows details of the DOCOD subroutine used to process characters in the buffers in the talk mode. In the first decision block at 210, a check is made to determine whether a return is to be made to the command mode. If so, the command mode linkages are restored (block 212), and an appropriate return is made as indicated at 214. If not, the appropriate COD entry is checked for an indication of the presence of another character (block 216), and return is made to the calling program if there is no character to be processed. If a character is to be processed, it is determined in block 218 whether it is a control character. If so, and if it is a carriage return (block 220), a carriage return and a line feed are echoed back to the source of the character (block 222) and a carriage return flag is set for use by the calling program. If the control character is not a carriage return, it is processed (block 224) before return to the calling program. If the character is a printable character (block 226), it is echoed back to its source device (block 228) before a return to the calling program.

The REMOTE Command and Mode

As discussed above, the REMOTE command is processed as a variant of the CALL command sequence, the only difference being that the REMOTE command specifies connection to port #0 at the recipient BIU. The significance of this connection will be apparent from FIG. 5c. The originator connections are the same as for a CALL, namely from COD-9 to POD-1 in the example. At the recipient BIU, connection is made from POD-0 to COD-0, and it will be recalled that there is another command interpreter and buffer associated with the COD-0 entry of the table. After entering a successful REMOTE command, the originating user's terminal will appear to be still in command mode. Everything entered into the terminal will be echoed back, not by the originating BIU, but instead by the recipient BIU. The originating user is effectively in control of the remote BIU instead of his own, and may issue any of the usual commands, which will be executed by the remote BIU.

Probably one of the most powerful aspects of the REMOTE command is that it permits a user to effect a connection of two other devices, located at two remote and unattended sites. Suppose, for example, that there is a high-speed printer connected to port #2 of a BIU named BILL SMITH, and that there is a terminal connected to port #1 of a BIU named JAKE JONES. A user at yet another BIU could connect the terminal to the printer by means of the command sequence.

REMOTE JONES,JAKE (to gain remote control)
PCALL SMITH,BILL,1,2 (to connect from the terminal on port #1 of the JONES BIU to the printer on port #2 of the Smith BIU.)

The Message and Announcement Commands

Figure 10:
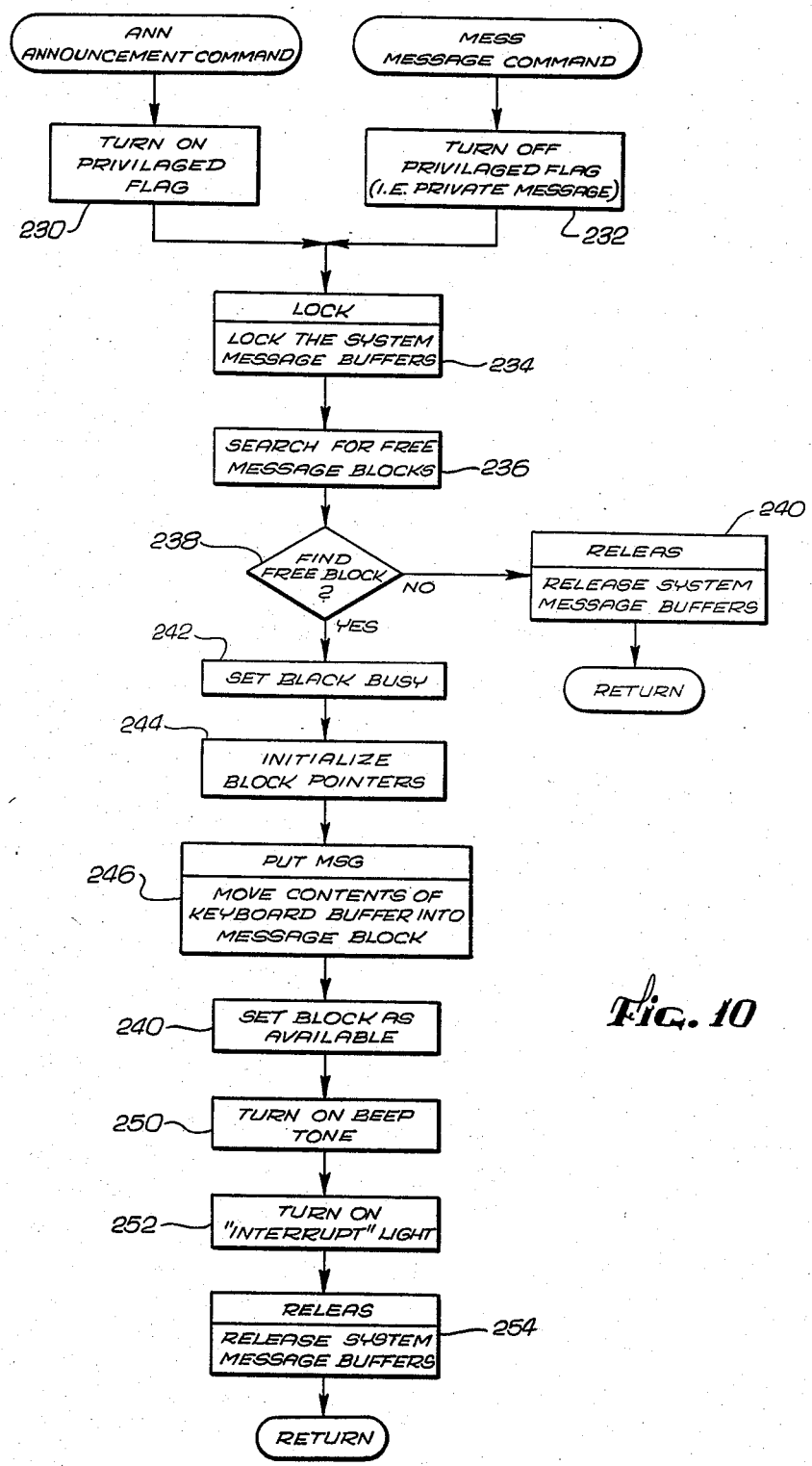
FIG. 10 is a flowchart defining the sequence of functions performed by the bus interface unit in response to an announcement (ANN) command and a message (MESS) command.

These commands may be issued in the remote mode, in which case their effect is to store a message at the remote BIU. They may also be issued in the command mode. For example, a user may leave an announcement on his own bus interface unit to explain his absence to other users. The only difference between the two commands is that the announcement (ANN) is not private and may be viewed by anyone accessing the BIU to which the message is directed. A message command (MESS), on the other hand, may be viewed only by someone with knowledge of a unique BIU password. An appropriate flag is set to indicate which type of command (ANN or MESS) has been made, as indicated in blocks 230 and 232 in FIG. 10. From this point on, the functions performed in executing the two commands are the same. The privileged flag set or not set in blocks 230 and 232 will not be consulted until a VIEW command is attempted, to view the stored message. If the message is private, an OPEN command will be required, to provide the password.

The message sequence follows the steps of locking access to system message buffers temporarily, while this message is being stored (block 234), and looking for a free message block (block 236). If no message block can be found (block 238), the system message buffers are released again (block 240) and a return is made to the calling program. If a free message block is found, in block 238, the block is tagged as busy (block 242), block pointers are initialized (block 244), and the contents of the keyboard buffer are transferred to the message block, in block 246. Then the block that was being used is set as available (block 248), a beep tone is turned on to indicate the stored message (block 250), a light is turned on for the same purpose (block 252), and the system buffers are released (block 254) before return to the calling program.

Task Organization

Figure 11:
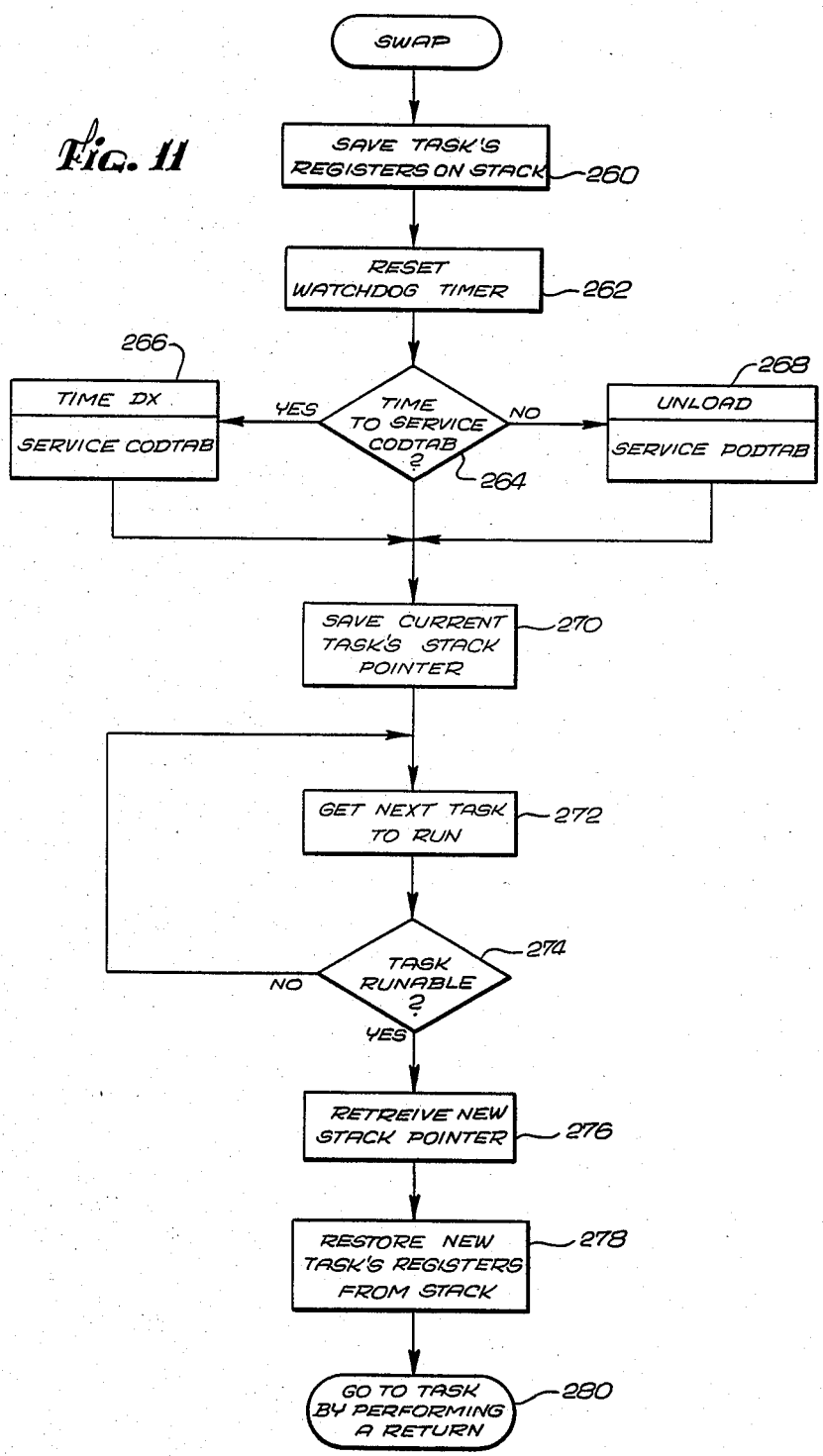
FIG. 11 is a flowchart of a task swapping program employed in the bus interface unit to share processing time among a number of tasks to be executed together.

The foregoing functions have been described in terms of sequences of operations performed by the BIU. In fact the various functions are performed or at least initiated by a number of separate program modules called tasks. Switching from task to task is controlled by a program called SWAP, a flowchart of which is shown in FIG. 11. Each task makes calls to SWAP on a very frequent basis, and on each entry to the SWAP program the calling task is suspended and another task is reactivated. SWAP activates tasks on a simple round-robin basis in a continuous sequence. Operation of the SWAP program will first be described, and then the various tasks identified.

On entry to the SWAP program, the calling task's registers are first saved, as indicated in block 260, and then a watchdog timer is reset, in block 262. A watchdog timer is a device commonly employed in real-time computer systems to ensure that certain key functions are performed on a timely basis. The watchdog timer causes an interrupt signal if it is not reset within a predetermined time, and the interrupt signal can be used to reinitialize the entire system if necessary. Since the SWAP program is supposed to be entered on a frequent basis, failure to call SWAP can only mean some type of malfunction that calls for recovery measures to be taken.

Another important function performed by the SWAP program is to service the CODTAB and PODTAB entries. At decision block 264, it is determined whether it is time to service the CODTAB entries. This decision is based on an examination of a memory location to see whether it is zero or not. An interrupt service routine is used to set the memory location to a non-zero value at a rate of 160 Hz. When the non-zero value is detected in block 264, a branch is made to a routine called TIMEDX, shown in block 266, which is responsible for servicing the CODTAB entries. In the present embodiment of the invention, there are a total of sixteen entries in CODTAB, although not all of them are used. On each entry into TIMEDEX, one entry of the CODTAB is checked to see whether any action is required, and the memory location checked in block 264 is reset to zero. Thus the entire CODTAB is serviced at a rate of 10 Hz.

It is estimated that the SWAP program is entered at a rate of several thousand times per second. On all of its other entries when a branch is not taken to the TIMEDX routine, the alternative branch is taken to a routine called UNLOAD, in block 268. Servicing the CODTAB entries in the TIMEDX routine involves checking each entry to see whether a packet of information is to be transferred over one of the COD to COD links or one of the COD to POD links established in the data mode, the talk mode, or the remote mode. If a transfer is to be made and can be made, a program operating under TIMEDX effects the transfer by appropriate manipulation of the table pointers. It will be recalled that there is, strictly speaking, no movement of information over the table links, only a logical movement of information effected by changing pointers that define the location of the information in relation to the I/O ports and processing tasks associated with the table.

In servicing the PODTAB entries, the UNLOAD routine performs a similar function for PODTAB that the TIMEDX routine performs for CODTAB. Each PODTAB entry is checked in turn to determine if any transfers are to be made, and the transfers are made whenever possible.

The remainder of the SWAP program is relatively routine. In block 270 a pointer to the current task's saved registers is also saved, then in block 272 the identity of the next task to be entered is obtained. As already mentioned, this is done on a simple round-robin basis. If the task can be presently run (block 274), a new pointer to a stack of saved task registers is obtained (block 276), the new tasks's registers are restored (block 278), and control is transferred to the new task by executing a return, as indicated at 280.

Task #0 is initially a system initialization task whose function is to initialize the entire system, including certain variables in RAM and EEPROM. It also initiates operation of the other tasks. After this initialization phase, which is executed only when power is first applied to the BIU, or when the BIU is reset to an initial state for some reason, task #0 becomes a program called CCPTSK. This is a continuously executing task that handles various operations requested by the system, such as updating the actuation of visible and audible indicators, and handling of QBN (query by name) calls.

Task #1 is designated OUTSDL and is the central program handling outbound SDLC information. Basically it is responsible for sending packets to the bus when they arrive at the PODTAB entries. Task #1 is also responsible for inputting packets to a data receiving BIU operating in what is referred to as receiver-driven mode. The receiver-driven mode will be discussed with reference to the data-mode state diagrams (FIGS. 16 and 17), but in brief it simply means that data transfers are being made under the control of the receiver rather than the transmitter of the data.

Tasks #4, #5 and #6 are all identical command interpreter tasks designated as CIL. Task #4 is associated with entry COD-0 in the CODTAB, and is used at a recipient BIU in a REMOTE command, to interpret commands from the originator BIU. Tasks #5 and #6 are associated with entries COD-1 and COD-2, respectively, and are used to interpret commands from local devices, as discussed in relation to the various commands.

Overlaying the task structure, are a number of executive request routines made from the tasks, and a number of interrupt response routines to which control is transferred upon the receipt of interrupt signals from the input/output devices. A complete description of these programs would add little to an understanding of the present invention, which relates specifically to various modes of connection and communication between user devices. If further detail is required as to the operation of specific routines or tasks, the complete listing of all CPU programs provided in Appendix II may be consulted.

BIU State Diagrams

The state diagrams of FIGS. 12–17 do not always relate directly to the programs and executable tasks that have been described, but the diagrams do provide a useful pictorial representation of the sequences of events related to various BIU functions. Each circle in the diagrams represents a state of the BIU, or more precisely, a state of part of the BIU, since the BIU can assume different states for different ones of its connected devices. The paths drawn between the state circles each represent a change in state, in the direction of the arrowhead on the path, caused by a "trigger" event written above a horizontal line appearing in a break in the path. In most cases, the "trigger" event causes an "action," written beneath the horizontal line in the transition path, as well as the change in state.

FIG. 12 shows the action of a transmitting BIU in sending a message in accordance with normal contention protocols. This means that the message packet is transmitted after a delay of 200 microseconds, provided that the bus is still not busy at the end of the delay. State 0 is the initial idle state of the BIU. When a request is received that requires the transmission of a normal contention protocol reply, the BIU goes either to state 1, if the bus in not busy, or to state 2 if the bus is busy. In state 2, the transmitting task is suspended temporarily, but will be frequently resumed to return to state 0 again, until such time as the bus is no longer busy. In state 1, a delay of 200 microseconds is allowed to elapse. Then, if the bus is still not busy, the message is transmitted and the unit goes to state 0. However, if the bus is busy at the time the delay is completed, the task will be suspended by a call to the SWAP program and the BIU will go to state 2. When the SWAP program resumes execution of the transmitting task, a return will be made to state 0, and if the bus is then no longer busy, there will be a transfer to state 1 again to wait out a new delay period before transmitting.

FIG. 13 shows the corresponding state diagram for an immediate acknowledgement transmission. Whatever state the BIU is in when it receives a message that requires an immediate response, the appropriate acknowledgement message is constructed and transmitted immediately. As will be seen, this has the advantage of providing a response to a request of some kind, such as a connect request, without having to wait for the requisite time delay in normal contention responses. In making an immediate response, the BIU does not relinquish the bus until the response is sent. The carrier signal is maintained and no other BIU can gain access to the bus until the immediate response is completed.

FIG. 14 is a state diagram showing BIU in various states when subject to connection and disconnection requests. In state 0 the BIU is in a ready and disconnected state. If a correct request CRQ message is received when not busy, in state 0, an immediate connect request acknowledge (CRA) is transmitted and the BIU goes into state 1, which is the busy and connected state. If a connect request (CRQ) is received when in the busy state, an immediate connect acknowledge busy (CAB) message is transmitted. When a disconnect (DIS) message is received, the BIU reverts to state 0 again. The same thing happens if the BIU is requested to initiate disconnection itself, by transmitting six consecutive DIS messages.

Figure 15:
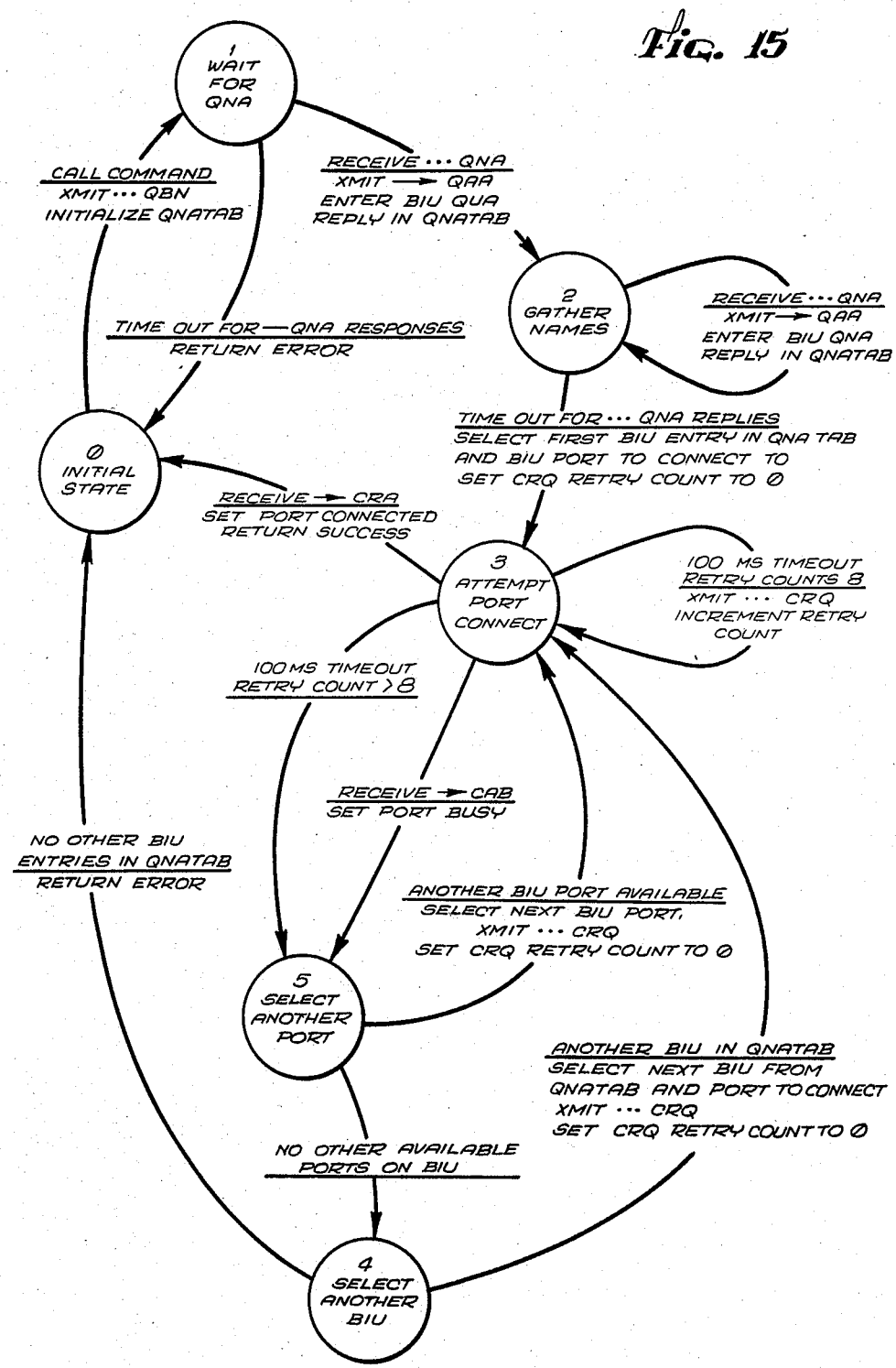
FIG. 15 is a state diagram illustrating operation of the bus interface unit in processing the various stages of a CALL command sequence.

FIG. 15 is a state diagram relating to the CALL command sequence. When in state 0, the initial state, the BIU receives a CALL command and transmits query by name (QBN) message, moving to state 1, where it waits for responses. If no responses are received within a predetermined time, the BIU returns to state 0, but if a query name acknowledge (QNA) is received, the BIU transmits an immediate query acknowledge acknowledge (QAA) and goes to state 2, where additional QAA responses may be received and handled the same way. When the time allowed for responses is up, the BIU selects the first response that it received and goes to state 3, where an attempt is made to achieve connection with the called BIU.

A connect request (CRQ) will be transmitted up to eight times when in this state 3. If an immediate connect request acknowledge (CRA) is received on any try, the BIU returns to state 0 and reports a successful connection. If an immediate connect acknowledge busy (CAB) message is received, the port is set to a busy status and the BIU goes to state 5, where another port is selected. State 5 is also reached if no response is received after eight tries to connect. If another port is available, return is made to state 3 to try up to eight more connect requests. If no other port is available on the first selected BIU, transition is made to state 4, where another BIU is selected from the responses received to the original QBN message, and transition is made to state 3 to try to connect with the next BIU. If no further BIU's are available and no connection has been achieved, transition is finally made back to state 0 with an error indication.

State diagrams for the PCALL and REMOTE commands are similar in most respects to FIG. 15. The only difference is that state 5 does not exist for those commands, since a specific port is selected for connection.

Figure 16:
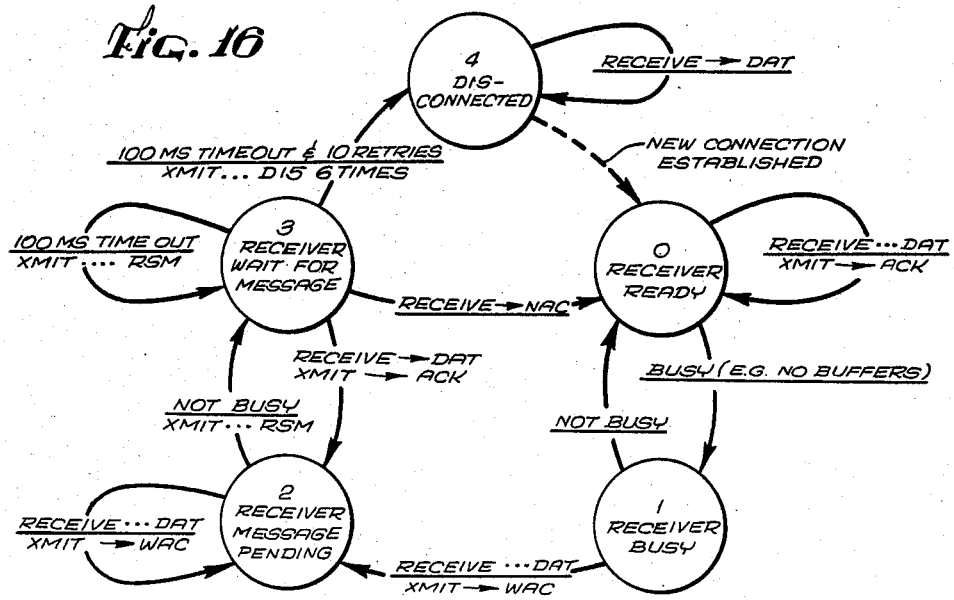
FIG. 16 is a state diagram illustrating operation of the bus interface unit in handling the receipt of data messages.

FIG. 16 is a state diagram showing the various states of a BIU acting as a receiver in a data transmission. It should be reviewed in conjunction with FIG. 17, which shows the corresponding states of a BIU acting as a transmitter in a data transmission. IN FIG. 16, state 0 shows the receiver in a ready state. If a data packet (DAT) is received while in this state, the immediate response is an acknowledge (ACK), and this sequence would normally continue until all the data had been received. This is referred to as the sender driven mode of data transmission.

If the receiver is busy, as shown by state 1, a received data packet (DAT) will generate an immediate wait acknowledge (WAC) transmission and the receiver will go to state 2, indicating that a transmission is pending. If a further DAT message is received while in this state, a further immediate WAC message will be sent in reply. When the receiver becomes not busy, it will transmit a resume with data (RSM) message, go to state 3, and wait for a data transmission. If there is no further data, a no data acknowledge (NAC) message will be received and the BIU will return to state 0. If a DAT message is received, the receiver responds with an ACK and returns to state 2. Further data will not then be accepted until another RSM message is transmitted. This is referred to as the receiver driven mode of data transmission. The BIU will not remain in state 3 indefinitely, of course. It will transmit up to ten RSM messages and if no further data or no data acknowledge (NAC) is received, will transmit a disconnect (DIS) message six times and go to a disconnected state, shown as state 4. In the disconnected state, further data messages will be ignored, and no further data transmission can occur until connection is re-established and a return made to state 0.

Figure 17:
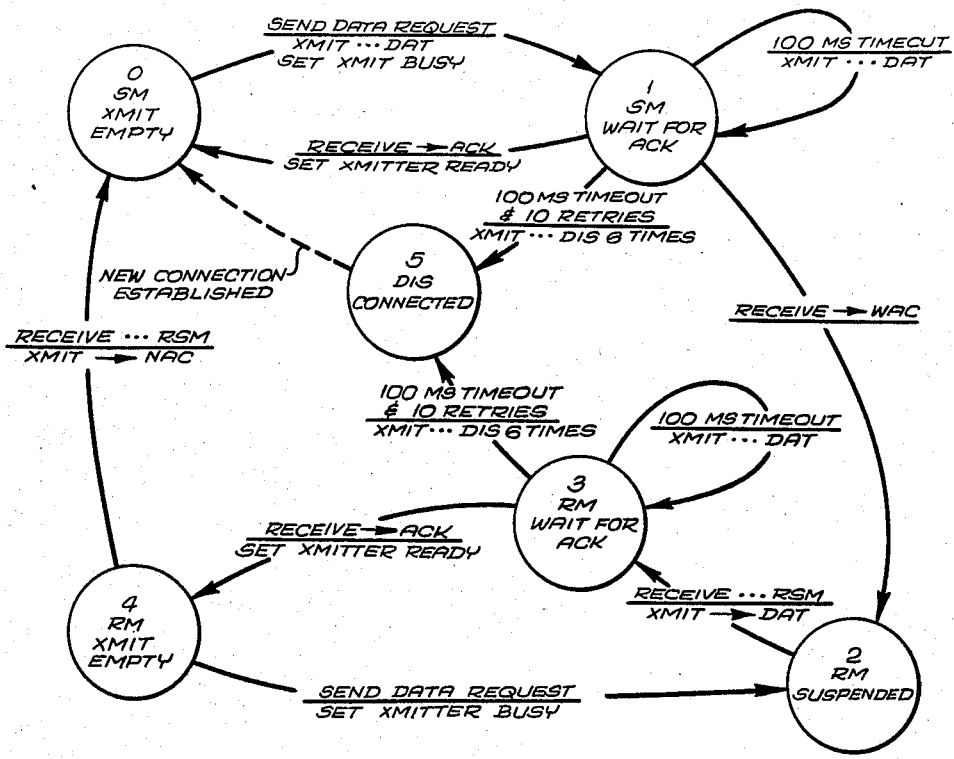
FIG. 17 is a state diagram illustrating operation of the bus interface unit in handling the transmission of data messages.

From the transmitter standpoint, FIG. 17 shows an initial state 0, in which the BIU first receives a request to send data. It transmits a DAT packet and waits in state 1 for an acknowledgement. If the ACK message is received, the transmitter returns to state 0, ready to send more data. This is the sender driven mode. If no ACK is received after a time-out period, the DAT message is retransmitted, and this sequence may be repeated up to ten times before going to a disconnected state, state 5. If, while in state 1, a WAC response is received, the transmitter goes to state 2, where it waits for a RSM message from the receiver. It has now entered the receiver driven mode. When a RSM message is received, the transmitter immediately sends another DAT packet, and goes to state 3 to wait for an ACK response. If no response is received after a time-out period and ten retries of the data transmission, the BIU goes to state 5 and is disconnected. If an ACK is received as a result of the last data transmission, the transmitter goes temporarily to state 4. From there, if there is more data to send, the BIU returns to state 2 and waits for another RSM message before transmitting. If there is no further data to send, the BIU will stay in state 4 until another RSM message is received, then will transmit a no data acknowledge (NAC) message and return to state 0. Upon reaching state 5 by either of the paths shown in FIG. 17, the BIU has to be reconnected before going to state 0 again to reinitiate data transmission.

It will be appreciated from the foregoing that the present invention represents a significant advance over bus interface units used in local-area networks of the prior art. In particular, the invention provides a novel technique for establishing a logical connection between two user devices on the network, and for establishing a conversational TALK mode without the intervention of a host computer. In addition the invention provides for a REMOTE mode in which a user may control a remote bus interface unit, and may store messages at the remote unit. It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. For use in a local-area computer network having a communication bus and a plurality of user devices connected to transmit and receive information over the bus, a bus interface unit comprising:

means for connecting said bus interface unit to a plurality of user devices, each of which is capable of transmitting information to or receiving information from said bus interface unit;

means for connecting said bus interface unit to the communication bus through a plurality of logical ports; and logical switching means for each user device, switchable between a command mode in which information from the user device is not passed to the bus, and a connected mode in which information from the user device is passed to the bus through its corresponding logical port, and information received from the bus through the same logical port is passed to the user device; and wherein said logical switching means is also switchable from the connected mode, in which the user device is logically connected to a remote device through the bus, to a talk mode, in which information entered into the user device is automatically transmitted to the connected remote device when a special character is encountered in the information, and information entered into the connected remote device is transmitted to said bus interface unit and is automatically output to the user device when a special character is encountered in the information.

2. A bus interface unit as set forth in claim 1, and further including:

information processing means coupled to said logical switching means and connected in the command mode to receive information from the user device, said information processing means including means for echoing each character of information back to its source and means for identifying commands in the information.

3. A bus interface unit as set forth in claim 2, wherein:

said means for identifying commands functions in response to identifying a "talk" command by switching said logical switching means to a talk mode in which said information processing means receives information both from the user device and from a remote user device with which connection is made;

said means for echoing each character of information back to its source is operative for both sources of information; and said information processing means further includes means for detecting a special character in the information from either source, and in response transmitting to the other source all of the information accumulated prior to the special character.

4. A bus interface unit as set forth in claim 2, wherein:

said means for identifying commands functions in response to identifying a "remote" command by switching said logical switching means to the connected mode, and effecting switching of a remote bus interface unit to a remote mode in which received information is interpreted for commands to the remote bus interface unit.

5. For use in a local-area computer network having a communication bus and a plurality of user devices connected to transmit and receive information over the bus, apparatus comprising:

at least two bus interface units for connection between the bus and user devices, said bus interface units being arbitrarily designated originating and recipient units, each of said bus interface units including information processing means, for storing and analyzing characters of information from a user device, including means for echoing characters back to the source and means for identifying commands in the information, and logical switching means having a first set of terminals connected one to each user device associated with said bus interface unit, a second set of terminals connected one to each logical port to the bus, at least one terminal connected to said information processing means, and having means for interconnecting said terminals to form logical message paths;

means initially active in the originating unit, for switching said logical switching means to a command mode in which a local user device is connected to said information processing means;

call request means activated in the originating unit upon identification of a CALL command in said information processing means, for requesting connection of the local user device with a device at the recipient unit, which is identified only by name in the CALL command;

call request processing means activated in the recipient unit for determining whether connection may be made in accordance with the CALL command;

first link storage means activated in both units after a successful connection request, for switching said logical switching means to a DATA mode in which a local device on one of the first set of terminals is connected to a port to the bus; and second link storage means activated in both units after a successful connection request, for storing the location and port of the other bus interface unit, with which connection has been established.

6. Apparatus as set forth in claim 5, wherein:

said call request means, call request processing means, first link storage means and second link storage means all function in the same way to establish a logical connection in response to a TALK command made at the originating unit;

said apparatus further includes talk switching means operative to modify said logical switching means in the originating unit, such that said information processing means receives information both from the local device and the remote device; and said information processing means further includes means responsive to detection of a special character, for transmitting information received from one source to the other source, whereby the local and remote devices are connected in a conversational talk mode.

7. Apparatus as set forth in claim 5, wherein:

said call request means, call request processing means, first link storage means and second link storage means all function in the same way to establish a logical connection in response to a REMOTE command made at the originating unit;

the connection made in the recipient unit is between a specially reserved bus port and said information processing means; and information entered into the local user device of the originating unit is processed for commands in the recipient unit, whereby the originating unit appears to be command mode, but is actually relaying commands to the recipient unit.

8. Apparatus as set forth in claim 7, wherein:

said information processing means in the recipient unit further includes means for processing a message command, storing a message for a recipient user, and activating a message indicator.

9. For use in a local-area computer network having a communication bus and a plurality of user devices connected to transmit and receive information over the bus, a bus interface unit comprising:

means for connecting said bus interface unit to a plurality of user devices, each of which is capable of transmitting information to or receiving information from said bus interface unit;

means for connecting said bus interface unit to the communication bus through an equal plurality of logical ports;

logical switching means having for each user device a command mode in which information from the user device is not passed to the bus, and also having for each user device a connected mode in which information from the user device is passed to the bus through its corresponding logical port, and information received from the bus through the same logical port is passed to the user device;

means for processing commands received from each of the user devices;

means for use when said bus interface unit is functioning as a calling unit, for transmitting the name of a called bus interface unit to all bus interface units in the network;

means for receiving an acknowledgement message from a called bus interface unit with a name matching the transmitted name, and for transmitting a connect request to the called bus interface unit; and means for receiving a connect request acknowledgement message from the called bus interface and switching said logical switching means to the connected mode in response to receipt of the acknowledgement, whereby the calling and called devices are logically connected for the transmission of further data messages.

10. A bus interface unit as set forth in claim 9, wherein:

said logical switching means is also switchable to a talk mode in which said means for processing commands is connected to receive information both from a local user device and a connected remote user device; and said means for processing commands includes means for echoing each character of information back to the source from which it was received, and means responsive to a specific character in the received information, for transmitting information received from one source over to the other source, whereby information entered at each connected device appears also at the other device.

11. A bus interface unit as set forth in claim 9, wherein:

said means for processing commands operates in response to a REMOTE command to initiate connection to a special port of a remote bus interface unit, the special port being connected to means for processing commands at the remote unit, whereby the remote unit will accept commands from a local device.

12. For use in a local-area network having a communication bus, a plurality of user devices and a plurality of bus interface units connected between the devices and the bus, a method comprising the steps of:

detecting a CALL command at an originating bus interface unit (BIU);

requesting connection to a recipient BIU identified by name in the CALL command;

determining at the recipient BIU whether connection may be completed; and if connection can be completed,
  transmitting a connect request acknowledgment from the recipient BIU to the originating BIU,
  establishing a first logical data path between the user device and a bus port at the originating BIU,
  establishing a second logical data path between a user device and a bus port at the recipient BIU, and
  establishing a third logical data path between the ports of the two BIU's.

13. A method as set forth in claim 12, wherein:

said method includes a first step of detecting a TALK command;

said requesting, determining and storing steps are also performed in response to detection of a TALK command; and said method further includes the subsequent steps of
  modifying the first logical connection to connect the user device and the bus port to an information storage and processing module,
  identifying a special character in information received either from the originating user device or the recipient user device, and
  transmitting, in response to the special character, information received from one source over to the other source.

14. A method as set forth in claim 12, wherein:

said method includes a first step of detecting a REMOTE command;

said steps of requesting, determining and storing first and third logical corrections are also performed in response to the REMOTE command; and said step of storing a second logical connection effects connection between a reserved bus port and a command processing module at the recipient BIU, whereby commands entered at the originator BIU device are executed at the recipient BIU.

15. A method as set forth in claim 14, and further including the steps of:
  entering a MESSAGE command at the originating BIU device; and
  executing the MESSAGE command at the recipient BIU, including the steps of storing a message accompanying the command, and activating a message indicator.

16. A method as set forth in claim 15, and further including the step of:
  retrieving the stored message at the recipient BIU.

17. A method as set forth in claim 14, and further including the steps of:
  entering a CALL command at the originating BIU device; and
  executing the CALL command at the recipient BIU, including the step of logically connecting a device at the recipient BIU to a device at a third BIU.

18. A method as set forth in claim 12, and further includint the steps of:
  transmitting a data packet from the originating BIU to the recipient BIU;
  receiving an acknowledge data message from the recipient BIU and repeating said transmitting step in response thereto;
  receiving a wait-acknowledge message from the recipient BIU;
  switching to a receiver-driven data transmission mode in response to the wait-acknowledge message;
  receiving a resume-with-data message from the recipient unit; and
  retransmitting the last data packet in response to the resume-with-data message;
  whereby data transmission takes place in a sender driven mode until a wait-acknowledge message is received, after which the transmission takes place in receiver-driven mode.

* * * * *